United States Patent
Yanagi et al.

(10) Patent No.: US 8,231,213 B2
(45) Date of Patent: Jul. 31, 2012

(54) INKJET INK COMPOSITION, INK SET, AND IMAGE FORMING METHOD

(75) Inventors: Terukazu Yanagi, Kanagawa (JP); Akio Tamura, Kanagawa (JP); Takahiro Ishizuka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 186 days.

(21) Appl. No.: 12/843,045

(22) Filed: Jul. 26, 2010

(65) Prior Publication Data

US 2011/0025753 A1 Feb. 3, 2011

(30) Foreign Application Priority Data

Jul. 30, 2009 (JP) ................................. 2009-177719
Sep. 2, 2009 (JP) ................................. 2009-203046

(51) Int. Cl.
*G01D 11/00* (2006.01)
(52) U.S. Cl. ..................................... 347/100; 106/31.65
(58) Field of Classification Search .................... 347/95, 347/96, 100; 106/31.65, 31.89, 31.59
See application file for complete search history.

(56) References Cited

U.S. PATENT DOCUMENTS 6,277,476 B1 * 8/2001 Shaw-Klein et al. ........ 428/32.3

FOREIGN PATENT DOCUMENTS

| JP | 10-195352 A | 7/1998 |
| JP | 2001-329199 A | 11/2001 |
| JP | 2006-273892 A | 10/2006 |

* cited by examiner

*Primary Examiner* — Lamson Nguyen
(74) *Attorney, Agent, or Firm* — Solaris Intellectual Property Group, PLLC

(57) ABSTRACT

An inkjet ink composition includes a colorant, two or more hydrophilic organic solvents, and particles of a polymer containing a structural unit derived from a hydrophilic monomer and a structural unit derived from a hydrophobic monomer. The polymer has a glass transition temperature of 150° C. or higher and an I/O value of from 0.2 to 0.55, and the particles of the polymer have a volume average particle diameter of from 0.1 to 10 nm.

13 Claims, 1 Drawing Sheet

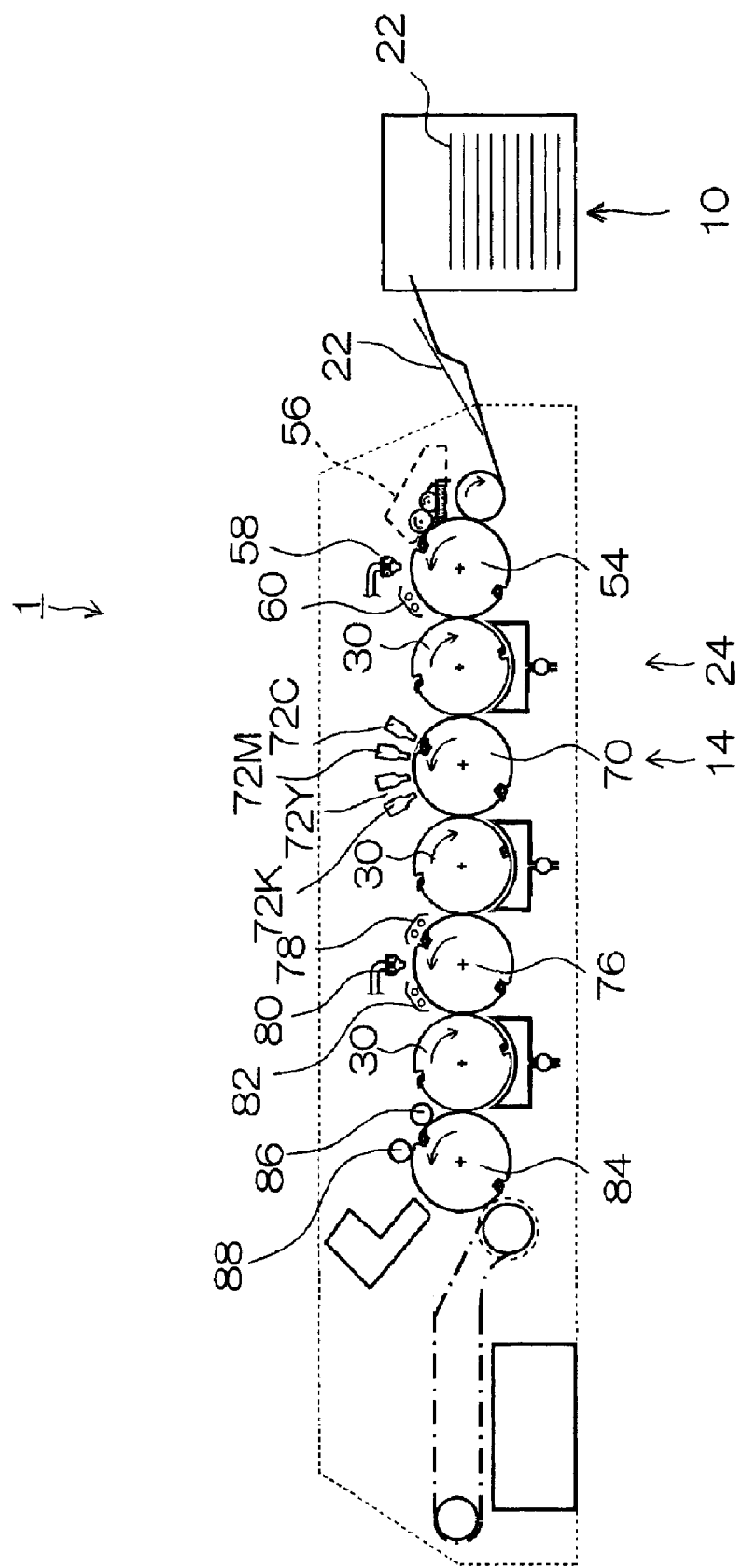

INKJET INK COMPOSITION, INK SET, AND IMAGE FORMING METHOD

CROSS-REFERENCE TO RELATED APPLICATION

This application is based on and claims priority under 35 USC 119 from Japanese Patent Application No. 2009-177719 filed on Jul. 30, 2009 and Japanese Patent Application No. 2009-203046 filed on Sep. 2, 2009, the disclosures of which are incorporated herein by reference.

BACKGROUND OF THE INVENTION

1. Field of the Invention

The present invention relates to an inkjet ink composition, an ink set, and an image forming method.

2. Description of the Related Art

Aqueous paints and inks have increasingly been used in recent years due to increased needs for, for example, resource conservation, environment preservation, and enhanced operational stability. The properties that the aqueous paints and aqueous inks are required to possess include fluidity, storage stability, gloss of a film formed therefrom, clearness, and coloring power, similarly to the case of oil-based paints and oil-based inks. However, most pigments have remarkably inferior adaptability (e.g., pigment dispersibility) to aqueous vehicles, compared to adaptability thereof to oil-based vehicles. Therefore, satisfactory quality cannot be obtained using usual dispersion methods. Although use of various additives, such as aqueous pigment-dispersing resins for aqueous systems and surfactants, has so far been studied, aqueous paints or aqueous inks that possess all of the properties described above and that are comparable to existing oil-based paints or oil-based inks having high quality have not been obtained.

In order to solve the problems, Japanese Patent Application Laid-open (JP-A) No. 2001-329199 discloses an aqueous ink composition containing a coloring agent coated with a water-insoluble polymer as a colorant and polymer particles, for example. An inkjet ink in which the aqueous ink composition is used is described to have excellent water resistance, abrasion resistance, marker resistance, and printing properties.

JP-A No. 2006-273892 discloses an ink composition containing at least a coloring agent coated with a water-insoluble polymer as a colorant and a resin emulsion as an additive, the water-insoluble polymer having a weight average molecular weight of from 50,000 to 150,000, the resin emulsion containing at least a polymer of which constituent component has the same structure as that of the water-insoluble polymer and which has a weight average molecular weight that is from 1.5 times to 4 times greater than that of the water-insoluble polymer. The ink is described to have favorable glossiness and abrasion resistance.

JP-A No. 10-195352 discloses an inkjet ink composition containing an aqueous carrier medium, a colorant that is insoluble in the aqueous carrier medium, and a hydrosol polymer. The ink composition is described to have stability and low viscosity.

SUMMARY OF THE INVENTION

However, whilst images formed from the ink compositions described in JP-A Nos. 2001-329199 and 2006-273892 exhibit improved abrasion resistance, they are not satisfactory in terms of blocking resistance.

The ink composition described in JP-A No. 10-195352 is not satisfactory in terms of blocking resistance.

The present invention aims at providing an inkjet ink composition having excellent ejectability maintenance properties and capable of forming an image having excellent blocking resistance, an ink set, and an image forming method capable of forming high-quality images over a long period.

An aspect of the invention is an inkjet ink composition comprising a colorant, two or more hydrophilic organic solvents, and particles of a polymer containing a structural unit derived from a hydrophilic monomer and a structural unit derived from a hydrophobic monomer and having a glass transition temperature of 150° C. or higher and an I/O value of from 0.2 to 0.55, the particles having a volume average particle diameter of from 0.1 to 10 nm.

Another aspect of the invention is an ink set comprising the above inkjet ink composition and a treatment liquid capable of aggregating components of the inkjet ink composition.

Another aspect of the invention is an image forming method comprising:

applying the above inkjet ink composition to a recording medium; and applying, to the recording medium, a treatment liquid capable of causing formation of an aggregate when contacting with components of the inkjet ink composition.

Another aspect of the invention is a recorded material obtainable by recording on a recording medium by the above image forming method.

BRIEF DESCRIPTION OF THE DRAWINGS

Exemplary embodiments of the present invention will be described in detail based on the following figures, wherein:

FIG. 1 is an entire-configuration diagram schematically showing an inkjet recording apparatus used in an embodiment.

DETAILED DESCRIPTION OF THE INVENTION

<Inkjet Ink Composition>

An inkjet ink composition of the invention (hereinafter simply referred to as "ink composition" in some cases) includes a colorant, two or more hydrophilic organic solvents, and particles of a polymer (hereinafter referred to as "self-dispersing polymer" in some cases) containing a structural unit derived from a hydrophilic monomer and a structural unit derived from a hydrophobic monomer and having a glass transition temperature of 150° C. or higher and an I/O value of from 0.2 to 0.55, the particles having a volume average particle diameter of from 0.1 to 10 nm.

The inkjet ink composition, having the above configuration, has excellent ejectability maintenance properties and is capable of forming an image having excellent blocking resistance. In particular, the inkjet ink composition has excellent ejectability maintenance properties and is capable of forming an image having excellent blocking resistance, even under high-temperature high-humidity conditions.

Self-Dispersing Polymer Particles

The inkjet ink composition of the invention includes particles of at least one self-dispersing polymer containing at least one kind of structural unit derived from a hydrophilic monomer and at least one kind of structural unit derived from a hydrophobic monomer and having a glass transition temperature of 150° C. or higher and an I/O value of from 0.2 to 0.55, the particles having a volume average particle diameter of from 0.1 to 10 nm (hereinafter also referred to as "first polymer particles").

The glass transition temperature (Tg) of the self-dispersing polymer in the invention is a measured Tg value obtained by actual measurement. Specifically, the measured Tg value is a value measured using a differential scanning calorimeter (DSC) EXSTAR6220 manufactured by SII Nanotechnology Inc. under normal measurement conditions.

However, a calculated Tg value obtained according to the following Equation (1) is applied if a measurement is difficult due to, for example, decomposition of the polymer.

The calculated Tg value is obtained according to the following Equation (1).

$$1/Tg = \Sigma(Xi/Tgi) \qquad \text{Equation (1)}$$

Here, it is assumed that the polymer of which Tg value is to be calculated is formed by copolymerization of n types of monomer component denoted by i=1 to n. Xi represents the weight fraction of the i-th monomer ($\Sigma Xi=1$), and Tgi represents the glass transition temperature (expressed by an absolute temperature) of a homopolymer of the i-th monomer, wherein $\Sigma$ represents the sum for from i=1 to i=n. As the value of the glass transition temperature (Tgi) of a homopolymer of each monomer, the value described in J. Brandrup, E. H. Immergut *Polymer Handbook* (3rd Edition) (Wiley-Interscience, 1989), which is incorporated herein by reference, is used.

The I/O value of the self-dispersing polymer is from 0.20 to 0.55, and is preferably from 0.30 to 0.54, more preferably from 0.40 to 0.50, from the viewpoints of blocking resistance and stability of the ink composition.

An I/O value of the self-dispersing polymer of 0.20 or higher improves stability of the ink composition. An I/O value of the self-dispersing polymer of 0.55 or lower improves blocking resistance (particularly under high-temperature high-humidity conditions).

The I/O value is also called inorganicity/organicity value and expresses the polarity of various organic compounds in a manner using organic conception. The I/O value is based on a functional group contribution method whereby a parameter is assigned to each functional group.

The I/O value is described in detail in, for example, Yoshio Koda "*Yuki Gainen-zu Kiso-to-Ouyou*" (Organic Conceptual Diagram, Basics and Applications) (Sankyo Publishing Co., Ltd., 1984), which is incorporated herein by reference. The concept of the I/O value is such that structures in a compound are classified, based on properties thereof, into organic functional groups representing covalent-bonding properties and inorganic functional groups representing ionic-bonding properties, and all organic compounds are each indicated by one point in a diagram having orthogonal coordinate axes of an organic axis and an inorganic axis.

The inorganicity value is obtained by quantification of the degree to which the boiling point an organic compound is influenced by various substituents, bonds, and the like that the compound has, assuming a hydroxyl group as a standard. Specifically, the distance between a boiling point curve of linear alcohols and a boiling point curve of linear paraffins in the vicinity of carbon number=5 is about 100° C., so that the degree of influence of one hydroxyl group is quantified to be 100, and values obtained by quantifying the degrees of influences of various substituents or various bonds on the boiling point based on the above value serve as inorganicity values of substituents that the organic compound has. For example, the inorganicity value of a —COOH group is 150, and the inorganicity value of a double bond is 2. Therefore, the inorganicity of an organic compound is the total sum of the inorganicity values of various substituents, bonds, and the like that the organic compound has.

Assuming that a methylene group in a molecule serves as a unit, the organicity value is determined based on the degree to which the boiling point is influenced by the carbon atom in the methylene group. More specifically, since an average increment of boiling point of linear saturated hydrocarbon compounds per one additional carbon atom is 20° C. within or around the range of $C_5$ to $C_{10}$, the organicity value of one carbon atom is thus determined to be 20, and the degrees of influences of various substituents, bonds, and the like on the boiling point are quantified on that basis, thereby providing organicity values. For example, the organicity value of a nitro group (—$NO_2$) is 70.

An I/O value closer to 0 indicates that the organic compound is more nonpolar (higher hydrophobicity and higher organicity). A higher I/O value indicates that the organic compound is more polar (higher hydrophilicity and higher inorganicity).

In the invention, the I/O value of a self-dispersing polymer is a value obtained according to the following method. The I/O value (=I value/O value) of each of the monomers for constituting the self-dispersing polymer is calculated based on the organicity (O values) and inorganicity (I values) described in Yoshio Koda "*Yuki Gainen-zu Kiso-to-Ouyou*" (Organic Conceptual Diagram, Basics and Applications) (Sankyo Publishing Co., Ltd., 1984), p. 13 and the like. For each of the monomers for constituting the polymer, the I/O value thereof is multiplied by the percent by mol thereof in the polymer. The resultant products of the respective monomers are summed up, the sum total is rounded off to two decimal places, and the obtained value is used as the I/O value of the self-dispersing polymer.

It should be noted that although inorganicity value of 2 is generally assigned to a double bond and added in a calculation method of inorganicity value of each monomer, the double bond disappears during polymerization. Therefore, the I/O value of a self-dispersing polymer in the invention is calculated using the inorganicity values of the monomers from which the inorganicity values of double bonds have been excluded.

In the invention, a polymer having a desired I/O value can be obtained by appropriately adjusting the structures and content ratios of monomers for constituting the self-dispersing polymer.

As used in the invention, the term "self-dispersing polymer particles" refers to particles of a water-insoluble polymer that, when dispersed by a phase inversion emulsification method, can get into a dispersed state in an aqueous medium even in the absence of a surfactant due to functional groups (particularly, acid groups or salts thereof) of the polymer itself.

The scope of the term "dispersed state" used herein includes both an emulsified state (emulsion) in which a water-insoluble polymer in the liquid state is dispersed in an aqueous medium and a dispersed state (suspension) in which a water-insoluble polymer in the solid state is dispersed in an aqueous medium.

The self-dispersing polymer in the invention is preferably a self-dispersing polymer that can get into a dispersed state in which the water-insoluble polymer is dispersed in the solid state, in consideration of ink fixability when the self-dispersing polymer is contained in a liquid composition.

A phase inversion emulsification method may be used as a method of achieving an emulsified state or dispersed state of the self-dispersing polymer (i.e., as a method of preparing an aqueous dispersion of the self-dispersing polymer). The phase inversion emulsification method may be, for example, a method including dissolving or dispersing the self-dispersing polymer in a solvent (for example, a hydrophilic organic solvent), directly adding the obtained liquid into water rather than adding a surfactant, stirring and mixing the resultant liquid in a state in which the salt-forming groups (such as acid groups) of the self-dispersing polymer are neutralized, and removing the solvent so as to obtain an aqueous dispersion that is in an emulsified or dispersed state.

The following procedure can be used to determine whether a water-insoluble polymer is a self-dispersing polymer as defined herein: 30 g of a water-insoluble polymer is dissolved in 70 g of an organic solvent (such as methyl ethyl ketone) to form a solution, the solution is mixed with 200 g of water and a neutralizing agent that can neutralize the salt-forming groups of the water-insoluble polymer to a degree of 100% (sodium hydroxide if the salt-forming groups are anionic, or acetic acid if the salt-forming groups are cationic), the mixture is agitated with an agitator having an agitation blade at a rotation rate of 200 rpm at 25° C. for 30 minutes, and the organic solvent is removed from the mixture liquid. If a stable emulsion or dispersion state of the water-insoluble polymer in the mixture liquid and absence of precipitation are confirmed by visual observation for at least one week at 25° C. after the removal of the organic solvent, the water-insoluble polymer is considered to be a self-dispersing polymer.

The stability of the emulsified or dispersed state of the self-dispersing polymer can be confirmed also by an accelerated sedimentation test involving centrifugal separation. The stability in the accelerated sedimentation test involving centrifugal separation can be evaluated by, for example, adjusting the aqueous dispersion of the polymer particles obtained as described above to have a solids content of 25% by mass, centrifuging the resultant aqueous dispersion at 12,000 rpm for one hour, and measuring the solids content of a supernatant after the centrifugal separation.

If the ratio of the solids content after centrifugal separation to the solids content before centrifugal separation is large (a value close to 1), it is indicated that sedimentation of the polymer particles due to centrifugal separation does not occur; in other words, the aqueous dispersion of the polymer particles is more stable. In the invention, the ratio of the solids content after centrifugal separation to the solids content before centrifugal separation is preferably 0.8 or higher, more preferably 0.9 or higher, and particularly preferably 0.95 or higher.

The term "water-insoluble polymer" as used herein refers to a polymer that shows a solubility of 10 g or less when the polymer is dried at 105° C. for 2 hours and then dissolved in 100 g of water at 25° C. The solubility is preferably 5 g or less, and more preferably 1 g or less. The solubility described above is a value measured after the polymer is 100% neutralized with sodium hydroxide or acetic acid depending on the type of the salt-forming groups of the water-insoluble polymer.

In the self-dispersing polymer in the invention, the content of water-soluble components that exhibit water solubility when the self-dispersing polymer is in a dispersed state is preferably 10% by mass or less, more preferably 8% by mass or less, and still more preferably 6% by mass or less. When the content of the water-soluble components is 10% by mass or less, swelling of polymer particles and adhesion between polymer particles are effectively prevented, and a more stable dispersed state is maintained; further, an increase in viscosity of the ink composition is suppressed, and, when the ink composition is applied to, for example, an inkjet method, ejection stability is improved.

Here, the term "water-soluble components" refers to compounds that are contained in the self-dispersing polymer and that dissolve in water when the self-dispersing polymer is in a dispersed state. The water-soluble components are water-soluble compounds that are generated as by-products or incorporated during the preparation of the self-dispersing polymer.

The self-dispersing polymer particles may include at least one kind of hydrophilic structural unit derived from a hydrophilic monomer and at least one kind of hydrophobic structural unit derived from a hydrophobic monomer. The main chain skeleton of the self-dispersing polymer is not particularly limited, and is preferably a vinyl polymer, more preferably a (meth)acrylic polymer, from the viewpoint of dispersion stability of the polymer particles. The term "(meth) acrylic polymer refers to a polymer containing at least one of a structural unit derived from a methacrylic acid derivative or a structural unit derived from an acrylic acid derivative.

(Hydrophilic Structural Unit)

The hydrophilic structural unit in the invention is not particularly limited as long as the hydrophilic structural unit derives from a hydrophilic-group-containing monomer (hydrophilic monomer). The hydrophilic structural units of the self-dispersing polymer may derive from only one kind of hydrophilic-group-containing monomer or from two or more kinds of hydrophilic-group-containing monomer. The expression " . . . structural unit . . . derived from . . . (A)" used herein means a component in a polymer which component is formed by the binding of (A) to an adjacent structural unit or units. The hydrophilic group is not particularly limited, and may be a dissociative group or a nonionic hydrophilic group.

In the invention, the hydrophilic groups of the hydrophilic structural units of the self-dispersing polymer preferably include at least one kind of dissociative group, more preferably include an anionic dissociative group, from the viewpoints of enhancing self-dispersibility and improving stability of the emulsified or dispersed state obtained. Examples of the anionic dissociative group include a carboxyl group, a phosphoric acid group, and a sulfonic acid group. A carboxyl group is particularly preferable from the viewpoint of the fixability of an ink composition containing the self-dispersing polymer particles.

The hydrophilic-group-containing monomer in the invention is preferably a dissociative-group-containing monomer, and more preferably a dissociative-group-containing monomer having a dissociative group and an ethylenic unsaturated bond, from the viewpoint of self-dispersibility.

Examples of the dissociative-group-containing monomer include an unsaturated carboxylic acid monomer, an unsaturated sulfonic acid monomer, and an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid. Examples of the unsaturated sulfonic acid monomer include styrenesulfonic acid, 2-acrylamide-2-methylpropane sulfonic acid, 3-sulfopropyl (meth)acrylate, and bis-(3-sulfopropyl)itaconate. Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, and at least one of acrylic acid or methacrylic acid is more preferable, in consideration of dispersion stability and ejection stability.

Examples of monomers having a nonionic hydrophilic group include: 2-methoxyethyl acrylate; 2-(2-methoxyethoxy)ethyl acrylate; 2-(2-methoxyethoxy)ethyl methacrylate; ethylenic unsaturated monomers containing a (poly) ethyleneoxy group or a polypropyleneoxy group such as ethoxytriethyleneglycol methacrylate, methoxypolyethyleneglycol (molecular weight: from 200 to 1,000) monomethacrylate, polyethyleneglycol (molecular weight: from 200 to 1,000) monomethacrylate; and ethylenic unsaturated monomers having a hydroxyl group such as hydroxymethyl (meth)acrylate, 2-hydroxyethyl (meth)acrylate, 2-hydroxypropyl (meth)acrylate, 4-hydroxybutyl (meth) acrylate, hydroxypentyl (meth)acrylate, and hydroxyhexyl (meth)acrylate.

Ethylenic unsaturated monomers terminated with an alkyl ether are more preferable examples of monomers having a nonionic hydrophilic group than ethylenic unsaturated monomers terminated with a hydroxyl group, from the viewpoints of stability of the particles and the content of water-soluble components.

Regarding the hydrophilic structural unit in the invention, it is preferable that the self-dispersing polymer includes only at least one hydrophilic structural unit each having an anionic dissociative group or include both of (i) at least one hydrophilic structural unit each having an anionic dissociative group and (ii) at least one hydrophilic structural unit each having a nonionic hydrophilic group.

It is also preferable that the self-dispersing polymer includes two or more kinds of hydrophilic structural unit having an anionic dissociative group, or that the self-dispersing polymer includes a hydrophilic structural unit having an anionic dissociative group and two or more kinds of hydrophilic structural unit having a nonionic hydrophilic group.

The content of hydrophilic structural units in the self-dispersing polymer is preferably 25% by mass or less, more preferably from 1% by mass to 25% by mass, still more preferably from 2% by mass to 23% by mass, and particularly preferably from 4% by mass to 20% by mass, from the viewpoints of viscosity and temporal stability.

When the self-dispersing polymer includes two or more kinds of hydrophilic structural unit, the total content of the hydrophilic structural units is preferably within the above range.

The content of hydrophilic structural units each having an anionic dissociative group in the self-dispersing polymer is preferably such that the acid value is within the preferable range described below.

The content of structural units each having a nonionic hydrophilic group is preferably from 0% by mass to 25% by mass, more preferably 0% by mass to 20% by mass, and particularly preferably from 0% by mass to 15% by mass, from the viewpoints of ejection stability and temporal stability.

When the self-dispersing polymer has an anionic dissociative group, the acid value thereof (in terms of mgKOH/g) is preferably from 50 mgKOH/g to 75 mgKOH/g, more preferably from 52 mgKOH/g to 75 mgKOH/g, and still more preferably from 55 mgKOH/g to 72 mgKOH/g, from the viewpoints of self-dispersibility, the content of water-soluble components, and fixability of an ink composition containing the self-dispersing polymer particles. The acid value is particularly preferably from 60 mgKOH/g to 70 mgKOH/g.

An acid value of 50 mgKOH/g or higher improves ejection response and ejectability maintenance properties of an ink composition containing the self-dispersing polymer. An acid value of 75 mgKOH/g or lower increases viscosity and improves blocking resistance.

(Hydrophobic Structural Unit)

The hydrophobic structural unit in the invention is not particularly limited as long as the unit is derived from a hydrophobic-group-containing monomer (hydrophobic monomer). The hydrophobic structural units of the self-dispersing polymer may derive from only one kind of hydrophobic-group-containing monomer, or from two or more kinds of hydrophobic-group-containing monomer. The hydrophobic group is not particularly limited, and may be a chain aliphatic group, a cyclic aliphatic group, or an aromatic group.

In the invention, the hydrophobic structural units of the self-dispersing polymer preferably include at least one kind of cyclic-aliphatic-group-containing monomer, and more preferably include a (meth)acrylate containing a cyclic aliphatic group (hereinafter referred to as "alicyclic (meth)acrylate" in some cases), from the viewpoints of blocking resistance, abrasion resistance, and dispersion stability.

-Alicyclic (Meth)Acrylate-

As used in the invention, the term "alicyclic (meth)acrylate" refers to a compound which includes a moiety derived from (meth)acrylic acid and a moiety derived from an alcohol (hereinafter referred to as alcohol-derived moiety in some cases), and has at least one substituted or unsubstituted alicyclic hydrocarbon group at the moiety derived from an alcohol. The alicyclic hydrocarbon group may be the alcohol-derived moiety itself, or may be bonded to a hydroxyl-group-derived portion via a linking group.

Thus, the alicyclic (meth)acrylate is a methacrylate or acrylate having an alicyclic hydrocarbon group.

The alicyclic hydrocarbon group is not particularly limited as long as it contains a cyclic non-aromatic hydrocarbon group. Examples thereof include monocyclic hydrocarbon groups, bicyclic hydrocarbon groups, and polycyclic hydrocarbon group having three or more rings.

Examples of alicyclic hydrocarbon groups include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, and a bicyclo[4.3.0]nonyl group.

The alicyclic hydrocarbon group may have a substituent. Examples of the substituent include an alkyl group, an alkenyl group, an aryl group, an aralkyl group, an alkoxy group, a hydroxyl group, a primary amino group, a secondary amino group, a tertiary amino group, an alkylcarbonyl group, an arylcarbonyl group, and a cyano group.

The alicyclic hydrocarbon group may include a condensed ring. The number of carbons in the alicyclic hydrocarbon group in the invention is preferably from 5 to 20 from the viewpoints of viscosity and solubility.

Preferable examples of the linking group that connects the alicyclic hydrocarbon group and the hydroxyl-group-derived portion include an alkyl group, an alkenyl group, an alkylene group, an aralkyl group, an alkoxy group, a monoethyleneglycol group, an oligoethyleneglycol group, a monopropyleneglycol group, and an oligopropyleneglycol group, each of which has from 1 to 20 carbon atoms.

Specific examples of the alicyclic (meth)acrylate in the invention include, but are not limited to, the following.

Examples monocyclic (meth)acrylates include a cycloalkyl (meth)acrylate of which cycloalkyl group has from 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of bicyclic (meth)acylates include isobornyl (meth)acrylate and norbornyl (meth)acrylate.

Examples of tricyclic (meth)acrylates include adamantyl (meth)acrylate, dicyclopentanyl (meth)acrylate, and dicyclopentenyloxyethyl (meth)acrylate.

The alicyclic (meth)acrylate may be used singly, or two or more alicyclic (meth)acrylates may be used in mixture.

The self-dispersing polymer preferably includes hydrophobic structural units derived from at least one alicyclic (meth)acrylate selected from bicyclic (meth)acrylates and polycyclic (meth)acrylates having three or more rings, and more preferably includes hydrophobic structural units derived from at least one of isobornyl (meth)acrylate, adamantyl (meth)acrylate, or dicyclopentanyl (meth)acrylate, from the viewpoints of the dispersion stability of the self-dispersing polymer particles, fixability, and blocking resistance.

In the invention, the content ratio of alicyclic (meth)acrylate-derived structural units contained in the self-dispersing polymer particles is preferably from 20% by mass to 90% by mass, and more preferably from 40% by mass to 90% by mass, from the viewpoints of improving the stability of the self-dispersing state, enhancing the stability of the particle shape in an aqueous medium through hydrophobic interactions between alicyclic hydrocarbon groups, and decreasing the amount of water-soluble components by an appropriate degree of hydrophobization of the particles. The content ratio of alicyclic (meth)acrylate-derived structural units contained in the self-dispersing polymer particles is particularly preferably from 50% by mass to 80% by mass.

Fixability and blocking resistance are improved by adjusting the content ratio of alicyclic (meth)acrylate-derived structural units to 20% by mass or higher. The stability of the polymer particles is improved by adjusting the content ratio of alicyclic (meth)acrylate-derived structural units to 90% by mass or lower.

As necessary, the self-dispersing polymer in the invention may further include other additional structural units as hydrophobic structural units, in addition to the alicyclic (meth)acrylate-derived structural units. The monomers for forming the additional structural units are not particularly limited as long as they are copolymerizable with the alicyclic (meth)acrylate and the hydrophilic-group-containing monomer, and may be a known monomer.

Specific examples of monomers for forming the additional structural units (hereinafter referred to as other copolymerizable monomers or additional copolymerizable monomers) include: alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; aromatic-ring-containing (meth)acrylates such as benzyl (meth)acrylate and phenoxyethyl (meth)acrylate; styrenes such as styrene, α-methylstyrene, and chlorostyrene; dialkylaminoalkyl (meth)acrylates such as dimethylaminoethyl (meth)acrylate; and (meth)acrylamides such as N-hydroxyalkyl (meth)acrylamides (such as N-hydroxymethyl (meth)acrylamide, N-hydroxyethyl (meth)acrylamide, and N-hydroxybutyl (meth)acrylamide) and N-alkoxyalkyl (meth)acrylamides (such as N-methoxymethyl (meth)acrylamide, N-ethoxymethyl (meth)acrylamide, N-(n-/iso)butoxymethyl (meth)acrylamide, N-methoxyethyl (meth)acrylamide, N-ethoxyethyl (meth)acrylamide, and N-(n-/iso)butoxyethyl (meth)acrylamide).

The additional copolymerizable monomers preferably include at least one (meth)acrylate containing a chain alkyl group having from 1 to 8 carbon atoms, more preferably include a (meth)acrylate having a chain alkyl group having from 1 to 4 carbon atoms, and particularly preferably include methyl (meth)acrylate and/or ethyl (meth)acrylate, from the viewpoints of ease of controlling the flexibility of polmer skeleton and glass transition temperature (Tg) and dispersion stability of the self-dispersing polymer. Here, the chain alkyl group refers to an alkyl group having a linear chain or a branched chain.

In the invention, use of a (meth)acrylate containing an aromatic group is also preferable.

When one or more aromatic-group-containing (meth)acrylates are contained as additional copolymerizable monomers, the content ratio of structural units derived from aromatic-group-containing (meth)acrylates is preferably 40% by mass or lower, more preferably 30% by mass or lower, and particularly preferably 20% by mass or lower, from the viewpoint of the dispersion stability of the self-dispersing polymer particles.

When one or more styrenic monomers are used as additional copolymerizable monomers, the content ratio of structural units derived from styrenic monomers is preferably 20% by mass or lower, more preferably 10% by mass or lower, and still more preferably 5% by mass or lower, from the viewpoint of the dispersion stability of the self-dispersing polymer particles. It is particularly preferable that the self-dispersing polymer does not include a structural unit derived from a styrenic monomer, from the viewpoint of the dispersion stability of the self-dispersing polymer particles.

Here, the term "styrenic monomer" encompasses styrene, substituted styrenes (α-methylstyrene, chlorostyrene, etc.), and styrene macromers having a polystyrene structural unit.

In the invention, an additional polymerizable monomer may be used singly, or two or more additional polymerizable monomers may be used in combination.

When the self-dispersing polymer includes additional structural units, the content thereof is preferably from 10% by mass to 80% by mass, more preferably from 15% by mass to 75% by mass, and particularly preferably from 20% by mass to 70% by mass. When two or more monomers for forming additional structural units are used in combination, the total content thereof is preferably within the above range.

The self-dispersing polymer in the invention is preferably a polymer obtained by copolymerization of at least three monomers including an alicyclic (meth)acrylate, an additional copolymerizable monomer, and a hydrophilic-group-containing monomer, and is more preferably a polymer obtained by copolymerization of at least three monomers including an alicyclic (meth)acrylate, an alkyl-group-containing (meth)acrylate having a C1 to C8 linear or branched chain, and a hydrophilic-group-containing monomer, from the viewpoint of dispersion stability.

In the invention, from the viewpoint of dispersion stability, it is preferable that the self-dispersing polymer does not substantially include a structural unit having a highly-hydrophobic substituent derived from a (meth)acrylate having a linear or branched chain alkyl group having 9 or more carbon atoms or from an aromatic-group-containing macromonomer, and it is more preferable that the self-dispersing polymer does not include a structural unit having a highly-hydrophobic substituent derived from a (meth)acrylate having a linear or branched chain alkyl group having 9 or more carbon atoms or from an aromatic-group-containing macromonomer, at all.

The self-dispersing polymer in the invention may be a random copolymer in which respective kinds of structural unit are introduced irregularly, or a block copolymer in which respective kinds of structural unit are introduced regularly. When the self-dispersing polymer is a block copolymer, the block copolymer may be synthesized by introducing the respective kinds of structural unit thereof in any order, and a same kind of constituent component may be used more than once. The self-dispersing polymer is preferably a random copolymer from the viewpoints of versatility and productivity.

The molecular weight range of the self-dispersing polymer in the invention, in terms of weight average molecular weight, is preferably from 3,000 to 200,000, and more preferably from 10,000 to 200,000, and still more preferably from 30,000 to 150,000. A weight average molecular weight of 3,000 or more effectively reduces the amount of water-soluble components. A weight average molecular weight of 200,000 or less enhances self-dispersing stability.

The weight average molecular weight can be measured with a gel permeation chromatograph (GPC).

The self-dispersing polymer in the invention preferably has an acid value of from 50 mgKOH/g to 75 mgKOH/g, more preferably from 52 mgKOH/g to 75 mgKOH/gs, still more preferably from 55 mgKOH/g to 72 mgKOH/g, and particularly preferably from 60 mgKOH/g to 70 mgKOH/g, from the viewpoints of viscosity control, ejection response, and ejectability maintenance properties of the ink composition.

An acid value of 50 mgKOH/g or higher improves ejection response and ejectability maintenance properties of an ink composition containing the self-dispersing polymer, an acid value of 75 mgKOH/g or lower increases viscosity.

In the invention, the acid value can be measured according to the method described in JIS standard (JIS K0070: 1992).

The self-dispersing polymer in the invention preferably has a neutralization degree of from 40 to 60%, more preferably from 45 to 55%, and particularly preferably from 47 to 53%, from the viewpoints of viscosity control, ejection response, and ejectability maintenance properties.

A neutralization degree of the self-dispersing polymer of 40% or higher increases viscosity and improves ejection response. A neutralization degree of the self-dispersing polymer of 60% or lower improves ejectability maintenance properties.

A neutralization degree of lower than 40% or higher than 60% may cause disadvantages such as inability to stably produce a self-dispersing polymer.

As used in the invention, the term "neutralization degree" refers to the amount of alkali, in terms of % by mol, that is added during the preparation of a self-dispersing polymer, assuming that the amount of the dissociative groups contained in the self-dispersing polymer chain is 100% by mol.

In regard to the combination of the acid value and neutralization degree of the self-dispersing polymer in the invention, it is preferable that the acid value is from 52 mgKOH/g to 75 mgKOH/g and the neutralization degree is from 45 to 55%, and it is more preferable that the acid value is from 55 mgKOH/g to 72 mgKOH/g and the neutralization degree is from 45 to 55%, and it is still more preferable that the acid value is from 55 mgKOH/g to 65 mgKOH/g and the neutralization degree is from 47 to 53%.

From the viewpoint of hydrophilicy-hydrophobicity control of the polymer, the self-dispersing polymer in the invention is preferably a vinyl polymer which includes at least one type of structure derived from an alicyclic (meth)acrylate at a total copolymerization ratio of from 20% by mass to 90% by mass, at least one type of structure derived from a dissociative-group-containing monomer, and at least one type of structure derived from a (meth)acrylate containing a C1 to C8 chain alkyl group, and which has an acid value of from 20 to 120 and a weight average molecular weight of from 3,000 to 200,000, and in which the total content of hydrophilic structural units is 25% by mass or lower, more preferably a vinyl polymer which includes at least one type of structure derived from a bicyclic or polycyclic (tri- or higher-cyclic) (meth)acrylate at a total copolymerization ratio of from 20% by mass to less than 90% by mass, at least one type of structure derived from a (meth)acrylate containing a C1 to C4 chain alkyl group at a total copolymerization ratio of from 10% by mass to less than 80% by mass, and at least one type of structure derived from a carboxyl-group-containing monomer at such a total copolymerization ratio that the acid value of the self-dispersing polymer is from 50 mgKOH/g to 75 mgKOH/g, and which has a weight average molecular weight of from 10,000 to 200,000, and in which the total content of hydrophilic structural units is 25% by mass or lower, and particularly preferably a vinyl polymer which includes at least one type of structure derived from a bicyclic or polycyclic (tri- or higher-cyclic) (meth)acrylate at a total copolymerization ratio of from 40% by mass to less than 80% by mass, at least one type of structure derived from methyl (meth)acrylate or ethyl (meth)acrylate at a total copolymerization ratio of from 20% by mass to less than 60% by mass, and at least one type of structure derived from acrylic acid or methacrylic acid at such a total copolymerization ratio that the acid value of the self-dispersing polymer is from 50 mgKOH/g to 75 mgKOH/g, and which has a weight average molecular weight of from 30,000 to 150,000, and in which the total content of hydrophilic structural units is 25% by mass or lower.

Exemplary compounds, which are specific examples of the self-dispersing polymer, are described below. However, the invention is not limited thereto. The numbers in parentheses indicate ratios by mass of copolymerization components.

Methyl methacrylate/isobornyl methacrylate/methacrylic acid (20/72/8) copolymer having a glass transition temperature of 180° C., an I/O value of 0.44, and an acid value of 52.1

Methyl methacrylate/isobornyl methacrylate/methacrylic acid (40/52/8) copolymer having a glass transition temperature of 160° C., an I/O value of 0.50, and an acid value of 52.1

Methyl methacrylate/isobornyl methacrylate/methacrylic acid (38/52/10) copolymer having a glass transition temperature of 160° C., an I/O value of 0.523, and an acid value of 65.1

Methyl methacrylate/isobornyl methacrylate/methacrylic acid (42/52/6) copolymer having a glass transition temperature of 161° C., an I/O value of 0.469, and an acid value of 39.1

Methyl methacrylate/isobornyl methacrylate/methacrylic acid (36.5/52/11.5) copolymer having a glass transition temperature of 160° C., an I/O value of 0.538, and an acid value of 74.8

Methyl methacrylate/isobornyl methacrylate/methacrylic acid (36/52/12) copolymer having a glass transition temperature of 160° C., an I/O value of 0.543, and an acid value of 78.1

Methyl methacrylate/isobornyl methacrylate/dicyclopentanyl methacrylate/methacrylic acid (20/62/10/8) copolymer having a glass transition temperature of 170° C., an I/O value of 0.44, and an acid value of 52.1

Methyl methacrylate/dicyclopentanyl methacrylate/methacrylic acid (20/72/8) copolymer having a glass transition temperature of 160° C., an I/O value of 0.47, and an acid value of 52.1

Methyl methacrylate/dicyclopentanyl methacrylate/methacrylic acid (18/72/10) copolymer having a glass transition temperature of 161° C., an I/O value of 0.47, and an acid value of 65.1

When calculating the I/O values described above, the following values were used as the I/O values of the monomers for forming the respective polymers.

Methyl methacrylate: 0.60 Isobornyl methacrylate: 0.29
Dicyclopentanyl methacrylate: 0.32 Methacrylic acid: 0.47

The method for preparing a self-dispersing polymer in the invention is not particularly limited, and the self-dispersing polymer can be prepared by copolymerizing a monomer mixture according to a known polymerization method. Among polymerization methods, polymerization in an organic medium is preferable, and a solution polymerization method is particularly preferable, from the viewpoint of ejection stability of an ink composition containing the self-dispersing polymer.

In the method for preparing a self-dispersing polymer of the invention, a self-dispersing polymer may be prepared by subjecting a mixture containing a monomer mixture and, optionally, an organic solvent and/or a radical polymerization initiator to a copolymerization reaction under an inactive gas atmosphere.

The method for producing an aqueous dispersion of self-dispersing polymer particles in the invention is not particularly limited, and an aqueous dispersion of self-dispersing polymer particles may be produced according to a known method. A step of obtaining an aqueous dispersion of self-dispersing polymer is preferably a phase inversion emulsification method that includes the following steps (1) and (2):

Step (1): a step of agitating a mixture containing a self-dispersing polymer, an organic solvent, a neutralizing agent, and an aqueous medium Step (2): a step of removing at least a part of the organic solvent from the resultant dispersion The step (1) is preferably a process in which the self-dispersing polymer is dissolved in the organic solvent, and then the neutralizing agent and the aqueous medium are gradually added to the polymer solution and mixed, by agitation, with the polymer solution to form a dispersion. When the neutralizing agent and the aqueous medium are added to the self-dispersing polymer solution in which the self-dispersing polymer is dissolved in the organic solvent as in the above process, self-dispersing polymer particles of which diameter is highly stable during storage can be obtained without requiring a strong shearing force.

The method of agitating the mixture is not particularly limited, and may be a method using a generally-used mixing and agitating apparatus and/or, if necessary, a disperser such as an ultrasonic disperser or a high-pressure homogenizer.

Preferable examples of the organic solvent include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the above solvents, ketone solvents such as methyl ethyl ketone and alcohol solvents such as isopropyl alcohol are preferable. It is also preferable to use isopropyl alcohol and methyl ethyl ketone together; using the solvents together makes it possible to obtain self-dispersing polymer particles having a very small particle diameter that are free from aggregation precipitation or adhesion between particles and that have high dispersion stability. The reasons for exerting these effects are thought to include, for example, a milder polarity change at the time of phase inversion from an oil phase to an aqueous phase.

The neutralizing agent is used to neutralize all or some of the dissociative groups of the self-dispersing polymer so as to allow the self-dispersing polymer particles to get into a stable emulsified or dispersed state in water. When the self-dispersing polymer has an anionic dissociative group as a dissociative group, the neutralizing agent to be used may be a basic compound such as an organic amine compound, ammonia, or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable from the viewpoint of stabilizing the dispersed state of the self-dispersing polymer particles of the invention in water.

In the step (2), the organic solvent is removed from the dispersion obtained by the step (1) using a common method such as distillation under reduced pressure, whereby phase inversion into an aqueous system occurs and an aqueous dispersion of the self-dispersing polymer particles is obtained. The organic solvent has substantially been removed from the obtained aqueous dispersion, and the amount of the remaining organic solvent is preferably 0.2% by mass or less, and more preferably 0.1% by mass or less.

The volume average particle diameter (hereinafter simply referred to as "average particle diameter" in some cases) of the self-dispersing polymer particles in the invention is preferably in the range of from 0.1 nm to 10 nm. When the volume average particle diameter is less than 0.1 nm, the viscosity increases excessively, thereby deteriorating ejectability maintenance properties. When the volume average particle diameter is more than 10 nm, the effects in increasing viscosity are reduced.

Within the above average particle diameter range, an average particle diameter of from 0.5 nm to 8 nm is preferable, an average particle diameter of from 1 nm to 7 nm is more preferable, an average particle diameter of from 1 nm to 5 nm is still more preferable, and an average particle diameter of from 1 nm to 4 nm is particularly preferable, in view of viscosity increase and ejection properties (such as ejection response and ejectability maintenance properties).

The above particle diameter range is preferable in that an average particle diameter of 0.1 nm or more increases production suitability and ejectability maintenance properties, and that an average particle diameter of 10 nm or less improves storage stability and ink viscosity increasing effects. When the self-dispersing polymer exerts viscosity increasing effects as well as self-dispersibility, the amount of thickener to be added can resultantly be decreased, and ejection response can thus be improved.

The particle diameter distribution of the self-dispersing polymer particles is not particularly limited, and may have a broad particle diameter distribution or a monodispersed particle diameter distribution. Two or more types of self-dispersing particles may be used in mixture.

The average particle diameter and particle diameter distribution of the self-dispersing polymer particles can be measured using, for example, a light scattering method.

It is preferable that the self-dispersing polymer particles in the ink composition of the invention do not substantially contain a colorant.

The self-dispersing polymer particles in the invention have excellent self-dispersibility, and the stability observed when the self-dispersing polymer particles are dispersed alone is remarkably high. However, the self-dispersing polymer particles do not have high capability as, for example, a dispersant, which stably disperses a pigment. Therefore, when the self-dispersing polymer particles in the invention are present in the ink composition that contains a pigment, the stability of the entire ink composition is resultantly be greatly lowered in some cases.

The inkjet ink composition of the invention may include self-dispersing polymer particles of only one type, or a mixture of two or more types of self-dispersing polymer particles. The content of self-dispersing polymer particles in the ink composition of the invention is preferably from 1% by mass to 30% by mass, more preferably from 2% by mass to 20% by mass, and particularly preferably from 2% by mass to 10% by mass, with respect to the inkjet ink composition, from the viewpoint of image gloss and the like.

In the inkjet ink composition of the invention, the content ratio of colorant particles to self-dispersing polymer particles (colorant particles/self-dispersing polymer particles) is preferably in the range of from 1/0.5 to 1/10, and more preferably in the range of from 1/1 to 1/4, from the viewpoint of, for example, abrasion resistance of an image.

Colorant

The inkjet ink composition of the invention includes at least one colorant.

Known dyes and pigments and the like may be used as colorants, without particular restrictions. In particular, colorants that are substantially insoluble in water or hardly soluble in water are preferable from the viewpoint of ink application properties. Specifically, examples include various pigments, disperse dyes, oil-soluble dyes, and colorants that form J aggregates. Pigments are more preferable.

In the invention, water-soluble pigments per se or pigments that have been surface-treated with a dispersant may be used as colorants.

(Pigment)

The type of the pigment in the invention is not particularly limited, and conventional known organic and inorganic pigments may be used. Examples of organic pigments include azo lakes, azo pigments, polycyclic pigments such as phthalocyanine pigments, perylene pigments, perinone pigments, anthraquinone pigments, quinacridone pigments, dioxazine pigments, diketopyrrolopyrrole pigments, thioindigo pigments, isoindolinone pigments, and quinophthalone pigments, dye lakes such as basic dye lakes and acidic dye lakes, nitro pigments, nitroso pigments, aniline black, and daylight fluorescent pigments. Examples of inorganic pigments include titanium oxide, iron oxide pigments, and carbon black pigments. Pigments that are not described in the Color Index may be used if they are dispersible in an aqueous phase. Further examples of pigments that may be used include those obtained by surface-treating the above pigments with a surfactant or a polymeric dispersant, and graft carbon. Of these pigments, preferable pigments for use include azo pigments, phthalocyanine pigments, anthraquinone pigments, quinacridone pigments, and carbon black pigments. Specific examples thereof include the pigments described in JP-A No. 2007-100071.

(Water-Insoluble Polymeric Dispersant)

When the colorant in the inkjet ink composition of the invention is a pigment, it is preferable that colorant particles containing the colorant covered with a dispersant are dispersed in an aqueous medium. The dispersant may be a polymeric dispersant or a low-molecular surfactant-type dispersant. The polymeric dispersant for dispersing the colorant is preferably a water-insoluble polymeric dispersant (hereinafter simply referred to as "dispersant"). The water-insoluble polymer (hereinafter referred to as "second polymer") is not particularly limited as long as it is capable of dispersing a colorant (particularly, a pigment), and conventional known water-insoluble polymeric dispersants may be used. The water-insoluble polymeric dispersant may include, for example, both a hydrophobic structural unit and a hydrophilic structural unit.

Examples of a monomer for forming the hydrophobic structural unit include styrenic monomers, alkyl (meth)acrylates, and aromatic-group-containing (meth)acrylates.

The monomer for forming the hydrophilic structural unit is not particularly limited as long as it contains a hydrophilic group. Examples of the hydrophilic group include a nonionic hydrophilic group, a carboxyl group, a sulfonic acid group, and a phosphoric acid group. The nonionic group has the same definition as the nonionic hydrophilic groups of the self-dispersing polymer described above.

From the viewpoint of dispersion stability, the hydrophilic structural unit in the invention preferably contains at least a carboxyl group, and it is also preferable that the hydrophilic structural unit contains both a nonionic hydrophilic group and a carboxyl group.

Examples of water-insoluble polymeric dispersants in the invention include a styrene-(meth)acrylic acid copolymer, a styrene-(meth)acrylic acid-(meth)acrylic ester copolymer, a (meth)acrylic ester-(meth)acrylic acid copolymer, a polyethyleneglycol (meth)acrylate-(meth)acrylic acid copolymer, and a styrene-maleic acid copolymer. Here, the term "(meth)acrylic acid" refers to acrylic acid or methacrylic acid.

In the invention, the water-insoluble polymeric dispersant is preferably a vinyl polymer containing a carboxyl group, and more preferably a vinyl polymer containing at least a structural unit derived from an aromatic-group-containing monomer as a hydrophobic structural unit and a carboxyl-group-containing structural unit as a hydrophilic structural unit.

The weight average molecular weight of the water-insoluble polymeric dispersant is preferably from 3,000 to 200,000, more preferably from 5,000 to 100,000, further preferably from 5,000 to 80,000, and particularly preferably from 10,000 to 60,000, from the viewpoint of dispersion stability of a pigment.

The content of dispersant in the colorant particles is preferably from 5% by mass to 200% by mass, more preferably from 10% by mass to 100% by mass, and particularly preferably from 20% by mass to 80% by mass, relative to the colorant (for example, pigment), from the viewpoints of dispersibility, ink application properties, and dispersion stability of the colorant (for example, pigment).

The colorant particles may include another dispersant, in addition to the water-insoluble polymeric dispersant. For example, conventional known water-soluble low-molecular dispersants, water-soluble polymers, and the like may be used. The content of dispersants other than the water-insoluble polymeric dispersant may be within the above content range for the dispersant.

<Thickener>

The inkjet ink composition of the invention preferably includes at least one thickener.

The thickener in the invention is preferably a water-soluble polymeric thickener. A compound may be used as a thickener without particular limitations if an aqueous solution in which the compound is dissolved has a higher viscosity than that of water.

The solubility of the thickener in the invention in 100 g of water at 25° C. is preferably 1 g or higher. The weight average molecular weight of the thickener is preferably from 3,000 to 100,000, more preferably from 4,000 to 50,000, and further preferably from 1,500 to 40,000.

The thickener may be, for example, any of a vinyl polymer, a polyether-type polymer, a polysaccharide-type polymer, a polyacrylic-type polymer, a pyrrolidone-type polymer, or a cellulose-type polymer.

Examples of the thickener include: gelatins; poly(vinyl alcohol)s; various modified poly(vinyl alcohol)s; polyvinylpyrrolidones; vinylformals and derivatives thereof; polyoxyalkyleneglycols; polymers containing acrylic groups such as polyacrylamide, polydimethylacrylamide, polydimethylaminoacrylate, poly(sodium acrylate), a salt of a copolymer of acrylic acid and methacrylic acid, poly(sodium methacrylate), and a salt of a copolymer of acrylic acid and vinyl alcohol; natural polymers or derivatives thereof, such as starch, oxidized starch, carboxylated starch, dialdehyde starch, dextrin, sodium alginate, gum arabic, casein, pullulan, dextran, and cellulose or derivatives thereof (such as methyl cellulose, ethyl cellulose, carboxymethyl cellulose, and hydroxypropyl cellulose); and synthetic polymers such as polyethyleneglycol, polypropyleneglycol, poly(vinyl ether), polyglycerin, a copolymer of maleic acid and an alkyl vinyl ether, a copolymer of maleic acid and N-vinylpyrrole, a copolymer of styrene and maleic anhydride, and polyethyleneimine.

Examples of thickeners that are preferable from the viewpoint of ejection stability include poly(vinyl alcohol), poly(vinyl pyrrolidone), polyoxyalkyleneglycols, gelatins, vinylformals and derivatives thereof, polymers containing acrylic groups such as a salt of a copolymer of acrylic acid and vinyl alcohol, and natural polymers or derivatives thereof such as starch, dextrin, gum arabic, casein, pullulan, dextran, cellulose or derivatives thereof (such as methyl cellulose, ethyl cellulose, carboxymethyl cellulose, and hydroxypropyl cellulose). More preferable examples include poly(vinyl alcohol), polyvinylpyrrolidone, and polyoxyalkyleneglycols.

The polyoxyalkyleneglycols each may include a single type of oxyalkylene group or two or more types of oxyalkylene group. When a polyoxyalkyleneglycol includes two or more types of oxyalkylene group, the polyoxyalkyleneglycol may be a random copolymer or a block copolymer.

In the invention, it is preferable that the thickener includes at least one of polyoxyethyleneglycol or polyoxyethylene-polyoxypropylene block copolymer, from the viewpoint of ejection stability.

The average polymerization degree of the polyvinyl alcohol is preferably from 100 to 3,500, and more preferably from 120 to 2,000, from the viewpoints of curl suppression and enhancement of ejection stability. The saponification degree is preferably 50% by mol or higher, and more preferably 70% by mol or higher, from the viewpoint of dispersion stability of the ink.

It is preferable that the thickener includes at least one selected from poly(vinyl alcohol), polyvinylpyrrolidone, polyoxyethyleneglycol, or polyoxyethylene-polyoxypropylene block copolymer, each of which has a weight average molecular weight of from 3,000 to 100,000. It is more preferable that the thickener includes at least one selected from poly(vinyl alcohol), polyvinylpyrrolidone, polyoxyethyleneglycol, or polyoxyethylene-polyoxypropylene block copolymer, each of which has a weight average molecular weight of from 4,000 to 50,000.

The thickener in the invention preferably includes a basic group or an acidic group.

Examples of the basic group include an amino group which may have a substituent, and a quaternary ammonium group. An amino group is preferable from the viewpoint of dispersion stability of the ink.

Examples of the acidic group include a carboxyl group, a phosphoric acid group, a phosphonic acid group, a sulfonic acid group, and a sulfonamide group. In particular, a carboxyl group and a sulfonic acid group are preferable from the viewpoint of dispersion stability of the ink.

The thickener having a basic group in the invention has at least one type of basic functional group. The amine value of the thickener having a basic group is preferably from 10 mgKOH/g or higher, more preferably from 20 mgKOH/g or higher, and further preferably 40 mgKOH/g or higher.

The thickener having an acidic group has at least one type of acidic functional group. The acid value of the thickener having an acidic group is preferably 10 mgKOH/g or higher, more preferably 20 mgKOH/g or higher, and still more preferably 40 mgKOH/g or higher.

Here, the amine value represents the total amount of primary, secondary, and tertiary amines, which are basic groups, and is expressed by the number of milligrams of KOH that is equimolar to the amount of hydrochloric acid required for neutralizing all the basic groups in 1 g of a sample. The acid value is the number of milligrams of KOH that is required for neutralizing all the acid groups contained in 1 g of a sample.

When the thickener in the invention includes a basic group, the pH of the inkjet ink composition is preferably 7.5 or higher, and more preferably from 8.0 to 9.0, from the viewpoint of dispersion stability of the ink.

When the thickener in the invention includes an acidic group, the pH of the inkjet ink composition is preferably 6.5 or lower, and more preferably from 5.0 to 6.0, from the viewpoint of dispersion stability of the ink.

In the invention, the thickener may be used singly, or in combination of two or more thereof.

The content of thickener in the inkjet ink composition may be adjusted in accordance with the type of the thickener. The content of thickener may be, for example, from 0.01% by mass to 20% by mass. The content of thickener is preferably from 0.01% by mass to 5% by mass, more preferably from 0.1% by mass to 3% by mass, and still more preferably from 0.1% by mass to 2% by mass, from the viewpoint of ejection stability.

<Nonionic Surfactant>

The inkjet ink composition of the invention preferably includes at least one nonionic surfactant (which may be simply referred to as "surfactant" in this section). The surface tension of the inkjet ink composition can be controlled by the addition of the surfactant.

In order that the inkjet ink composition can be ejected by inkjet in a satisfactory manner, the amount of the surfactant to be added is preferably such that the surface tension of the ink of the invention is adjusted to be from 20 mN/m to 60 mN/m, more preferably from 20 mN/m to 45 mN/m, and still more preferably from 25 mN/m to 40 mN/m.

Examples of nonionic surfactants include polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octylphenoxyethyl polyethoxyethanol, nonylphenoxyethyl polyethoxyethanol, and acetylene-type polyethylene oxide surfactants, such as SURFYNOL series (trade name, manufactured by Air Products & Chemicals, Inc.) and OLFINE E1010 (tradename, manufactured by Nissin Chemical Industry Co., Ltd.). The inkjet ink composition of the invention may include one of, or two or more of, these nonionic surfactants. Acetylene-type polyethylene oxide surfactants are preferable.

The amount of nonionic surfactants contained in the inkjet ink composition of the invention is not particularly limited, and is preferably 1% by mass or higher, more preferably from 1% by mass to 10% by mass, and still more preferably from 1% by mass to 3% by mass, relative to the total amount of the inkjet ink composition.

(Other Additives)

Other additives, such as basic substances (neutralizing agent) and other surfactants, may be added to the colorant particles, as necessary.

(Basic Substance)

A neutralizing agent (an organic base or an inorganic alkali) may be used as the basic substance. The basic substance may be added so as to neutralize the dispersant such that the pH of the composition containing the dispersant is adjusted to be from 7 to 11, more preferably from 8 to 10.

The content of basic substance is preferably from 50% by mol to 150% by mol, more preferably from 70% by mol to 120% by mol, and particularly preferably from 80% by mol to 100% by mol, relative to 100% by mol of ionic groups of the dispersant.

Specific examples of basic substances include the above-described examples of the basic compound as a neutralizing agent for the self-dispersing polymer particles.

(Preparation Method of Colorant Particle Dispersion)

The colorant particles can be obtained as a colorant particle dispersion, by dispersing a mixture containing, for example, a pigment, a dispersant, and, optionally, a solvent (preferably an organic solvent) and the like using a disperser.

The colorant particle dispersion is preferably prepared by: mixing a solution which contains water as a main component and further contains a pigment, a dispersant, an organic solvent capable of dissolving or dispersing the dispersant, and a basic substance (a mixing and hydration process); and removing the organic solvent (a solvent removal process).

This method of preparing a colorant particle dispersion enables preparation of a colorant particle dispersion in which colorant particles as described above are finely dispersed and which has excellent storage stability.

The organic solvent used in the method of preparing a colorant particle dispersion is capable of dissolving or dispersing a dispersant in the invention, and preferably has a certain degree of affinity for water. Specifically, the organic solvent preferably has a solubility of from 10% by mass to 50% by mass in water at 20° C.

More specifically, the colorant particle dispersion can be prepared by a preparation method that includes the following steps (1) and (2). However, the preparation of the colorant particle dispersion is not limited thereto, and the colorant particle dispersion may be prepared by other methods.

Step (1): a step of subjecting a mixture containing a pigment, a dispersant, an organic solvent capable of dissolving or dispersing the dispersant, a basic substance, and water to a dispersing treatment.

Step (2): a step of removing at least a part of the organic solvent from the mixture after the dispersing treatment.

In the step (1), a dispersant as described above is dissolved or dispersed in an organic solvent to form a mixture thereof (a mixing process). Then, (i) a solution containing water as a main component and further contains a pigment and a basic substance, (ii) water, and, optionally, (iii) a surfactant and the like are added to the mixture, and the resultant mixture is subjected to a mixing and dispersing treatment, as a result of which an oil-in-water colorant particle dispersion is obtained.

The amount of the basic substance to be added (neutralization degree) is not particularly limited. Usually, the acidobasicity of the finally-obtained colorant particle dispersion is preferably at or close to neutrality, for example, at a pH (25° C.) of from 4.5 to 10. Further, the pH can be determined by the neutralization degree for the dispersant.

The pigment, dispersant, and other additives used in the method of preparing a colorant particle dispersion have the same definitions as described in the above section (explanation) for colorant particles, and preferable definitions thereof are also the same.

Preferable examples of organic solvents that can be used in the invention include alcohol solvents, ketone solvents, and ether solvents. Examples of alcohol solvents include ethanol, isopropanol, n-butanol, tertiary butanol, isobutanol, and diacetone alcohol. Examples of ketone solvents include acetone, methyl ethyl ketone, diethyl ketone, and methyl isobutyl ketone. Examples of ether solvents include dibutyl ether, tetrahydrofuran, and dioxane. Of these solvents, isopropanol, acetone, and methyl ethyl ketone are preferable, and methyl ethyl ketone is particularly preferable.

The organic solvent may be used singly, or two or more thereof may be used in combination.

In the preparation of a colorant particle dispersion, a kneading-dispersing treatment can be performed while applying a strong shear force, using, for example, a two-roll mill, a three-roll mill, a ball mill, a trommel, a disper, a kneader, a coknéader, a homogenizer, a blender or a uniaxial or biaxial extruder.

The specifics of the kneading and dispersing are described in T. C. Patton "Paint Flow and Pigment Dispersion" (John Wiley and Sons Inc., 1964) and the like.

A fine-dispersing treatment may be conducted, as necessary, using beads that are made of glass, zirconia or the like and that have a particle diameter of from 0.01 mm to 1 mm, and using mainly a vertical or horizontal sand grinder, a pin mill, a slit mill, a ultrasonic disperser or the like; as a result, a colorant particle dispersion is obtained.

In the method for preparing a colorant particle dispersion, the manner of removing the organic solvent is not particularly limited. For example, the organic solvent may be removed by a known method such as distillation under reduced pressure.

The colorant particles in the colorant particle dispersion obtained is capable of maintaining excellent dispersion state, and the colorant particle dispersion obtained has excellent temporal stability.

In the invention, the average particle diameter of the colorant particles is preferably from 10 nm to 200 nm, more preferably from 10 nm to 150 nm, and still more preferably from 10 nm to 100 nm. An average particle diameter of 200 nm or less realizes excellent color reproduction and, in an inkjet method, excellent ejection properties. An average particle diameter of 10 nm or more realizes excellent light fastness.

The particle diameter distribution of the colorant particles is not particularly limited, and may be a broad particle diameter distribution or a monodispersed particle diameter distribution. In an embodiment, two or more types of colorant particles having a monodispersed particle diameter distribution are used in mixture.

The average particle diameter and the particle diameter distribution of the colorant particles can be measured using, for example, a dynamic light scattering method.

The ink composition of the invention may include colorant particles of only one type, or two or more types of colorant particles in combination.

The content of colorant particles is preferably from 0.1% by mass to 25% by mass, more preferably from 1% by mass to 20% by mass, still more preferably from 1.5% by mass to 15% by mass, and particularly preferably from 1.5% by mass to 10% by mass, relative to the ink composition, from the viewpoint of image density.

Hydrophilic Organic Solvent

The inkjet ink composition of the invention includes two or more hydrophilic organic solvents.

The two or more hydrophilic organic solvents preferably include a first hydrophilic organic solvent having an I/O value of from 0.70 to less than 1.00. An I/O value of the first hydrophilic organic solvent of less than 1.00 improves compatibility with self-dispersing polymer particles, more effectively improves the fixability of an image formed, and further improves abrasion resistance of an image. An I/O value of the first hydrophilic organic solvent of 0.70 or more improves stability of the ink composition.

The I/O value of a hydrophilic organic solvent is calculated in the same manner as the calculation of the I/O value of a self-dispersing polymer described above.

The inkjet ink composition of the invention preferably further includes a second hydrophilic organic solvent having an I/O value of from 1.00 to 1.50, in addition to the first hydrophilic organic solvent. An I/O value of the second hydrophilic organic solvent of 1.00 or more improves the stability of the ink composition more effectively. An I/O value of the second hydrophilic organic solvent of 1.50 or less suppresses reduction of the fixability of an image formed. In the inkjet ink composition, there may be one hydrophilic organic solvent that fulfills the definition of the first hydrophilic organic solvent, or there may be two or more hydrophilic organic solvents each of which fulfills the definition of the first hydrophilic organic solvent. Similarly, there may be one hydrophilic organic solvent that fulfills the definition of the second hydrophilic organic solvent, or there may be two or more hydrophilic organic solvents each of which fulfills the definition of the second hydrophilic organic solvent.

Specific examples of the first hydrophilic organic solvent, which has an I/O value of from 0.70 to less than 1.00, include glycol ethers, among which propyleneglycol ethers or ethyleneglycol ethers are preferable, and propyleneglycol ethers are more preferable. Specific examples thereof include tripropyleneglycol monomethyl ether (I/O value: 0.80), tripropyleneglycol monoethyl ether (I/O value: 0.73), tripropyleneglycol monobutyl ether (I/O value: 0.61), dipropyleneglycol monoethyl ether (I/O value: 0.78), dipropyleneglycol monobutyl ether (I/O value: 0.70), and propyleneglycol monobutyl ether (I/O value: 0.88).

Among them, tripropyleneglycol monomethyl ether (I/O value: 0.80) is preferable from the viewpoints of image fixability and ink stability.

Specific examples of the second hydrophilic organic solvent, which has an I/O value of from 1.0 to 1.5, include propyleneglycol monomethyl ether (I/O value: 1.50), propyleneglycol monoethyl ether (I/O value: 1.20), diethyleneglycol monobutyl ether (I/O value: 1.40), triethyleneglycol monobutyl ether (I/O value: 1.20), 2,2-diethyl-1,3-propanediol (I/O value: 1.43), 2-methyl-2-propyl-1,3-propanediol (I/O value: 1.43), 2,4-dimethyl-2,4-pentanediol (I/O value: 1.43), 2,5-dimethyl-2,5-hexanediol (I/O value: 1.25), tripropyleneglycol (I/O value: 1.33), and SANNIX (NEW-POL) GP250 (I/O value: 1.30, tradename, manufactured by Sanyo Chemical Industries Ltd.). Of these, SANNIX GP250 is preferable from the viewpoints of image fixability and ink stability.

The content of the first hydrophilic organic solvent in the inkjet ink composition of the invention is preferably from 0.1% by mass to 20% by mass, more preferably from 1% by mass to 16% by mass, and further preferably from 2% by mass to 12% by mass, from the viewpoints of image fixability and ink stability.

More specifically, the inkjet ink composition preferably includes a hydrophilic organic solvent having an I/O value of from 0.70 to less than 1.00 as the first organic solvent at a content of from 1% by mass to 16% by mass, and more preferably includes a hydrophilic organic solvent having an I/O value of from 0.70 to less than 0.90 at a content of from 2% by mass to 12% by mass.

The content of the second hydrophilic organic solvent in the inkjet ink composition of the invention is preferably from 0.1% by mass to 20% by mass, more preferably from 1% by mass to 16% by mass, and further preferably from 2% by mass to 12% by mass, from the viewpoints of image fixability and ink stability.

More specifically, the inkjet ink composition preferably includes a hydrophilic organic solvent having an I/O value of from 1.00 to 1.50 as the second organic solvent at a content of from 1% by mass to 16% by mass, and more preferably includes a hydrophilic organic solvent having an I/O value of from 1.20 to 1.40 at a content of from 2% by mass to 12% by mass.

The content ratio of the second hydrophilic organic solvent to the first hydrophilic organic solvent (second hydrophilic organic solvent: first hydrophilic organic solvent) in the inkjet ink composition of the invention is preferably in the range of from 1:10 to 10:1, more preferably in the range of from 1:4 to 4:1, and still more preferably in the range of from 1:2 to 2:1, from the viewpoints of image fixability and ink stability.

The inkjet ink composition of the invention may further include one or more other additional hydrophilic organic solvents, in addition to the first hydrophilic organic solvent and the second hydrophilic organic solvent. Polyhydric alcohols, when used as additional hydrophilic organic solvents, are useful as drying prevention agents or moistening agents. Examples thereof include glycerin (I/O value: 5.00), ethyleneglycol (I/O value: 2.00), diethyleneglycol (I/O value: 5.00), triethyleneglycol (I/O value: 3.43), propyleneglycol (I/O value: 2.50), dipropyleneglycol (I/O value: 2.00), 1,3-butanediol (I/O value: 2.50), 2,3-butanediol (I/O value: 2.50), 1,4-butanediol (I/O value: 2.50), 3-methyl-1,3-butanediol (I/O value: 2.00), 1,5-pentanediol (I/O value: 2.00), tetraethyleneglycol (I/O value: 2.91), 1,6-hexanediol (I/O value: 1.67), 2-methyl-2,4-pentanediol (I/O value: 1.67), polyethyleneglycol (of which I/O value depends on the number of repetitions of ethylene chain), 1,2,4-butanetriol (I/O value: 3.75), and 1,2,6-hexanetriol (I/O value: 2.50). These additional hydrophilic organic solvents may be used singly, or in combination of two or more thereof.

Polyol compounds are preferable for use as penetrating agents. Preferable examples of aliphatic diols include 2-ethyl-2-methyl-1,3-propanediol (I/O value: 1.67), 3,3-dimethyl-1,2-butanediol (I/O value: 1.67), 5-hexene-1,2-diol, 2-ethyl-1,3-hexanediol (I/O value: 2.00), and 2,2,4-trimethyl-1,3-pentanediol (I/O value: 1.88).

The content of additional hydrophilic organic solvents may be, for example, 16% by mass or lower, more preferably 12% by mass or lower, and still more preferably 8% by mass or lower.

The inkjet ink composition of the invention includes two or more hydrophilic organic solvents. The total content of hydrophilic organic solvents in the inkjet ink composition is preferably from 1% by mass to 60% by mass, more preferably from 5% by mass to 40% by mass, and particularly preferably from 10% by mass to 30% by mass, from the viewpoints of stability and ejection properties.

The amount of water to be used in the invention is not particularly limited, and the content of water in the inkjet ink composition is preferably from 10% by mass to 99% by mass, more preferably from 30% by mass to 80% by mass, and still more preferably from 50% by mass to 70% by mass, from the viewpoints of providing stability and ensuring ejection reliability.

Water-Soluble Acidic Compound

The inkjet ink composition of the invention may include a water-soluble acidic compound.

The water-soluble acidic compound is not particularly limited as long as the compound dissolves in water, has a molecular weight of 200 or less, and has a functional group that dissociates to exhibit acidity when the compound is dissolved in water. The water-soluble acidic compound may be an organic compound or an inorganic compound. Here, the term "dissolves" or "soluble" refers to a solubility of 5 g of more in 100 g of water at 25° C.

Examples of the water-soluble acidic compound and salts thereof in the invention include acidic compounds such as carboxylic acid derivatives, sulfonic acid derivatives, phosphoric acid derivatives, and inorganic acids, and a compound in which an acidic functional group of any of the above compounds forms a salt. In view of ejection stability, the water-soluble acidic compound is preferably an organic compound selected from a carboxylic acid derivative, a sulfonic acid derivative, or a phosphoric acid derivative, and is more preferably a carboxylic acid derivative or a sulfonic acid derivative, and still more preferably a carboxylic acid derivative.

The molecular weight of the water-soluble acidic compound is 200 or less, and is preferably from 30 to 200, more preferably from 45 to 150, and still more preferably from 50 to 140, from the viewpoint of ejection response.

When the molecular weight of the water-soluble acidic compound exceeds 200, ejection stability is deteriorated in some cases.

Examples of a cation that forms a salt together with the water-soluble acidic compound include an alkali metal ion such as sodium ion, lithium ion, or potassium ion, ammonium ion ($NH_4^+$), and an aminoalcohol ion such as monoethanol ammonium ion ($HOCH_2CH_2NH_3^+$). The cation for forming the salt may be a single type of cation or a combination of two or more types of cation.

Specific examples of water-soluble acidic compounds and salts thereof include: acidic compounds having a carboxyl group, such as acrylic acid, methacrylic acid, maleic acid, malic acid, tartaric acid, fumaric acid, lactic acid, succinic acid, glutaric acid, butanoic acid, and acetic acid, and salts thereof; and acidic compounds having a sulfonyl group, such as methanesulfonic acid and p-toluenesulfonic acid, and salts thereof.

The water-soluble acidic compound or salt thereof preferably includes at least one selected from an acidic compound containing a carboxyl group, a salt thereof, or a salt of an inorganic acid, more preferably includes at least one selected from an acidic compound containing a carboxyl group and having a molecular weight of from 30 to 200, a salt thereof, or a salt of an inorganic acid, and still more preferably includes at least one selected from maleic acid, malic acid, tartaric acid, succinic acid, glutaric acid, acetic acid, butanoic acid, or an alkali metal salt of any of these acids, from the viewpoints of ejectability maintenance properties and ease of viscosity control.

In the invention, the total content of water-soluble acidic compounds and salts thereof is preferably from 0.1% by mass to 0.5% by mass, and more preferably from 0.2% by mass to 0.4% by mass, relative to the total mass of the polymer particles.

A content of from 0.1% by mass to 0.5% by mass is preferable since, within this content range, control of the volume average particle diameter of the polymer particles is facilitated, viscosity is high, and ejectability maintenance properties are excellent.

In the invention, the inkjet ink composition preferably includes at least one of a water-soluble acidic compound or a salt thereof such that the total content of water-soluble acidic compounds and salts thereof in the inkjet ink composition is from 0.1% by mass to 0.5% by mass, the inkjet ink composition more preferably includes at least one of an acidic compound containing a carboxyl group, a salt thereof, or a salt of an inorganic acid such that the total content of acidic compounds containing a carboxyl group, salts thereof, and salts of inorganic acids in the ink composition is from 0.1% by mass to 0.5% by mass, the inkjet ink composition still more preferably includes at least one of a water-soluble acidic compound containing a carboxyl group and having a molecular weight of from 30 to 200 or a salt thereof such that the total content of water-soluble acidic compounds containing a carboxyl group and having a molecular weight of from 30 to 200 and salts thereof in the inkjet ink composition is from 0.1% by mass to 0.5% by mass, and the inkjet ink composition particularly preferably includes at least one of maleic acid, malic acid, tartaric acid, succinic acid, glutaric acid, acetic acid, butanoic acid, or an alkali metal salt thereof such that the total content of maleic acid, malic acid, tartaric acid, succinic acid, glutaric acid, acetic acid, butanoic acid, and alkali metal salts thereof in the inkjet ink composition is from 0.1% by mass to 0.5% by mass, from the viewpoints of viscosity and ejectability maintenance properties.

<Solid Moistening Agent>

The inkjet ink composition of the invention includes at least one solid moistening agent.

Incorporation of a solid moistening agent into the inkjet ink composition is preferable due to resultant improvement in removability by wiping-off.

As used in the invention, the term "solid moistening agent" refers to a water-soluble compound which has water retention capability and which is solid at 25° C.

General solid moistening agents for use in aqueous ink compositions, as they are, may be used as solid moistening agents in the invention. Specific examples thereof include polyhydric alcohols such as saccharides, sugar alcohols, hyaluronic acids, trimethylolpropane, and 1,2,6-hexanetriol, urea, and urea derivatives.

Examples of the urea derivatives include thiourea, a compound obtained by replacing a hydrogen on the nitrogen of urea by an alkyl group or alkanol, and a compound obtained by replacing a hydrogen of the nitrogen of thiourea by an alkyl group or alkanol. Specific examples thereof include N,N-dimethylurea, thiourea, ethyleneurea, hydroxyethylurea, hydroxybutylurea, ethylenethiourea, and diethylthiourea.

Examples of the saccharides include monosaccharides, disaccharides, oligosaccharides such as trisaccharides and tetrasaccharides, and polysaccharides. Specific examples thereof include glucose, mannose, fructose, ribose, xylose, arabinose, galactose, aldonic acid, glucitol, sorbitol, maltose, cellobiose, lactose, sucrose, trehalose, and maltotriose. As used herein, the term "polysaccharide" refers to a sugar in a broad sense, and encompasses substances widely spread in nature, such as alginic acid, α-cyclodextrin, and cellulose. Examples of derivatives of saccharides include reducing sugars (such as sugar alcohols) of the above saccharides, and oxidized sugars (such as aldonic acids, uronic acids, amino acids, and thiosugars) of the above saccharides. In particular, sugar alcohols are preferable, and specific examples thereof include maltitol, sorbitol, and xylitol. A commercially available 1% aqueous solution of sodium hyaluronate (molecular weight 350,000) may be used as a salt of hyaluronic acid.

Among them, urea and urea derivatives are more preferable for use as solid moistening agents in the invention, due to their high moisture retention capability.

The content of solid moistening agent in the ink composition of the invention is preferably 5% by mass or higher, more preferably from 5% by mass to 30% by mass, and still more preferably from 5% by mass to 20% by mass, from the viewpoint of improving removability by wiping off.

The combination of the content of solid moistening agent in the inkjet ink composition of the invention and the content of polymer particles in the inkjet ink composition is not particularly limited, and the following combinations are preferable from the viewpoint of more effectively achieving both of image fixability and removability by wiping off.

Specifically, it is preferable that the content of solid moistening agent is 5% by mass or higher and that the content of polymer particles is 5% by mass or higher. It is more preferable that the content of solid moistening agent is from 5% by mass to 20% by mass and that the content of polymer particles is from 5% by mass to 20% by mass. It is particularly preferable that the content of solid moistening agent is from 5% by mass to 10% by mass and that the content of polymer particles is from 5% by mass to 10% by mass.

The ratio of the solid moistening agent content to the total solids content (including the contents of the water-insoluble polymeric dispersant, the pigment, and the polymer particles) of the ink composition (the mass of solid moistening agent/ the total mass of solids) is preferably 0.3 or higher, more preferably in the range of from 0.4 to 2.0, and most preferably in the range of from 0.5 to 1.5.

(Other Additives)

In addition to the components described above, the inkjet ink composition in the invention may further include one or more other additives, as necessary.

Examples of other additives in the invention include known additives such as an anti-fading agent, an emulsion stabilizer, a penetration enhancing agent, a UV absorber, an antiseptic agent, an antimildew agent, a pH adjuster, a surface-tension controller, an antifoam agent, a viscosity adjuster, a dispersant, a dispersion stabilizer, an antirust agent and a chelating agent. These additives may be directly added to the inkjet ink composition after the preparation of the inkjet ink composition, or may be added during the preparation of the inkjet ink composition. Specific examples of the additives include the additives that are described as other additives in paragraphs [0153] to [0162] of JP-A No. 2007-100071, which are incorporated herein by reference.

Examples of the surface-tension controller include nonionic surfactants, cationic surfactants, anionic surfactants, and betaine surfactants.

The amount of surface-tension controller to be added is preferably such that the surface tension of the ink composition is adjusted to be from 20 mN/m to 60 mN/m, more preferably from 20 mN/m to 45 mN/m, and further preferably from 25 mN/m to 40 mN/m, in order to enable favorable ink spotting by an inkjet method. The amount of surface tension controller to be added is preferably such that the surface tension of the ink composition is adjusted to be from 20 mN/m to 60 mN/m, more preferably from 30 mN/m to 50 mN/m, if the application of the ink is performed by a method other than inkjet.

In the invention, the surface tension of the ink composition is measured by a plate method at 25° C.

Preferable examples of surfactants include, as hydrocarbon surfactants, anionic surfactants such as fatty acid salts, alkyl sulfates, alkyl benzene sulfonates, alkyl naphthalene sulfonates, dialkyl sulfosucciniates, alkyl phosphates, formalin condensates of naphthalene sulfonates, and polyoxyethylene alkyl sulfates; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene-oxypropylene block copolymers. Further, acetylene-type polyoxyethyleneoxide surfactants, such as SURFYNOL series (trade name, manufactured by Air Products & Chemicals, Inc.) and OLFINE E1010 (tradename, manufactured by Nissin Chemical Industry Co., Ltd.), and amine oxide-type amphoteric surfactants such as N,N-dimethyl-N-alkylamine oxide are also preferable.

Moreover, compounds described as surfactants in JP-A No. 59-157636, pp. 37 to 38 and Research Disclosure No. 308119 (1989) are also applicable.

Fluoro(fluoroalkyl) surfactants, silicone surfactants or the like, such as those described in JP-A No. 2003-322926, 2004-325707 and 2004-309806, may be used to improve the anti-abrasion properties.

The aforementioned surface-tension controller may be used also as an antifoam agent, and fluorine-containing compounds, silicone compounds, chelate compounds such as EDTA may be used.

When the application of the ink is performed by an inkjet method, the viscosity of the inkjet ink composition of the invention is preferably from 4.5 mPa·s to 6.5 mPa·s, more preferably from 5 mPa·s to 6 mPa·s, from the viewpoints of ejection stability and coagulation speed.

When the application of the inkjet ink composition is performed by a method other than inkjet, the viscosity of the inkjet ink composition is preferably from 1 mPa·s to 40 mPa·s, and more preferably from 5 mPa·s to 20 mPa·s.

Here, the viscosity of the inkjet ink composition is a value obtained by a measurement using an E-type viscometer (manufactured by TOKI SANGYO CO., LTD.) at 25° C.

<Ink Set>

The ink set of the invention includes at least one kind of inkjet ink composition of the invention and at least one kind of treatment liquid capable of causing aggregation when contacting with the inkjet ink composition.

The specifics of the inkjet ink composition are as described above.

-Treatment Liquid-

The treatment liquid in the invention is capable of causing aggregation when contacting with the inkjet ink composition described above. Specifically, the treatment liquid preferably includes an aggregating component capable of causing formation of an aggregate by aggregating dispersed particles, such as colorant particles (pigment and the like), contained in the ink composition. The treatment liquid may further include other components, as necessary. Use of the treatment liquid with the ink composition realizes inkjet recording at higher speeds, and realizes formation of an image having high density, high resolution, and excellent print properties (such as reproduction of thin lines and fine areas) even at high recording speeds.

(Aggregating Component)

The treatment liquid may include at least one aggregating component capable of causing an aggregate when contacting with the ink composition. As a result of the treatment liquid mixing into the ink composition deposited by an inkjet method, aggregation of pigment and the like that have been stably dispersed in the ink composition is promoted.

The treatment liquid is, for example, a liquid that is capable of causing formation of an aggregate by changing the pH of the ink composition. In this case, the pH (at 25° C.±1° C.) of the treatment liquid is preferably from 1 to 6, more preferably from 1.2 to 5, and still more preferably from 1.5 to 4, from the viewpoint of the coagulation speed of the ink composition. In this case, the pH (at 25° C.±1° C.) of the ink composition to be ejected is preferably from 7.5 to 9.5, and more preferably from 8.0 to 9.0.

In the invention, it is preferable that the pH (at 25° C.±1° C.) of the ink composition is 7.5 or higher and that the pH of the treatment liquid (at 25° C.±1° C.) is from 1.5 to 3, from the viewpoints of image density, resolution, and inkjet recording at higher speeds.

The aggregating component may be used singly, or two or more thereof may be used in mixture.

The treatment liquid may include at least one acidic compound as an aggregating component. Examples of acidic compounds that can be used include compounds having a phosphoric acid group, a phosphonic acid group, a phosphinic acid group, a sulfuric acid group, a sulfonic acid group, a sulfinic acid group, or a carboxyl group, and salts thereof (such as polyvalent metal salts thereof). From the viewpoint of coagulation speed of the ink composition, compounds having a phosphoric acid group or a carboxyl group are preferable, and compounds having a carboxyl group are more preferable.

The compounds having a carboxyl group are preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, and nicotinic acid, derivatives of these compounds, and salts thereof (such as polyvalent metal salts thereof).

These compounds may be used singly, or in combination of two or more thereof.

The treatment liquid may include, as an aggregating component, a polyvalent metal salt, a polyallylamine, or a polyallylamine derivative. Use of this treatment liquid improves high-speed aggregation properties. Examples of the polyvalent metal salt include: a salt of an alkaline earth metal, which belongs to Group 2 of the Periodic Table, such as magnesium or calcium; a salt of a transition metal belonging to Group 3 of the Periodic Table, such as lanthanum; a salt of a metal belonging to Group 13 of the Periodic Table, such as aluminum; and a salt of a lanthanide, such as neodymium. The salt of such a metal is preferably a carboxylic acid salt (such as a formate, acetate, or benzoate), a nitrate, a chloride, or a thiocyanate. In particular, the following salts are preferable: a calcium or magnesium salt of a carboxylic acid (such as formic acid, acetic acid, or benzoic acid); a calcium or magnesium salt of nitric acid; calcium chloride; magnesium chloride; and a calcium or magnesium salt of thiocyanic acid.

The content of polyvalent metal salt in the treatment liquid is preferably from 1% by mass to 10% by mass, more preferably from 1.5% by mass to 7% by mass, and still more preferably from 2% by mass to 6% by mass, form the viewpoint of aggregation effects.

The treatment liquid may include at least one cationic organic compound as an aggregation agent. Examples of the cationic organic compound include cationic polymers such as a poly(vinylpyridine) salt, poly(alkylaminoethyl acrylate), poly(alkylaminoethyl methacrylate), poly(vinylimidazol), polyethyleneimine, polybiguanide, polyguanide, and polyallylamine, and derivatives thereof.

The weight average molecular weight of the cationic polymer is preferably smaller from the viewpoint of the viscosity of the treatment liquid. When the treatment is applied to a recording medium by an inkjet method, the weight average molecular weight of the cationic polymer is preferably in the range of from 1,000 to 500,000, more preferably from 1,500 to 200,000, and still more preferably from 2,000 to 100,000. A weight average molecular weight of 1000 or more is preferable in terms of aggregation speed, and a weight average molecular weight of 500,000 or less is preferable in terms of ejection reliability. The above preferable ranges do not apply when the treatment liquid is applied to a recording medium by methods other than inkjet.

The cationic organic compound is preferably, for example, a primary, secondary, or tertiary amine salt-type compound. Examples of the amine salt-type compound include a cationic amine salt-type compound and an amphoteric surfactant that exhibits cationic properties at a desired pH range. Examples of the cationic amine salt-type compound include: hydrochloride or acetate of an amine, such as hydrochloride or acetate of laurylamine, cocoamine, stearylamine, rosin amine, or the like; a quaternary ammonium salt compound such as lauryl trimethyl ammonium chloride, cetyl trimethyl ammonium chloride, lauryl dimethyl benzyl ammonium chloride, benzyl tributyl ammonium chloride, or benzalkonium chloride; a pyridinium salt compound such as cetylpyridinium chloride or cetylpyridinium bromide; an imidazoline-based cationic compound such as 2-heptadecenyl-hydroxyethyl imidazoline; and an ethyleneoxide adduct of a higher alkylamine such as dihydroxyethyl stearylamine. Examples of the amphoteric surfactant that exhibits cationic properties at a desired pH range include: amino acid-type amphoteric surfactant, a compound having a structure represented by R—NH—$CH_2CH_2$—COOH(R representing an alkyl group or the like), a carboxylate-type amphoteric surfactant such as stearyl dimethyl betaine or lauryl dihydroxyethyl betaine, a sulfuric ester-type amphoteric surfactant, a sulfonic acid-type amphoteric surfactant, and a phosphoric ester-type amphoteric surfactant.

Among them, the cationic organic compound preferably has di- or higher-valency.

The content of cationic organic compound in the treatment liquid is preferably from 1% by mass to 50% by mass, and more preferably from 2% by mass to 30% by mass, from the viewpoint of aggregation effects.

Among them, a di- or higher-valent carboxylic acid or a di- or higher-valent cationic organic compound is preferable as an aggregating component, from the viewpoints of aggregation properties and abrasion resistance of an image.

The viscosity of the treatment liquid is preferably in the range of from 1 mPa·s to 30 mPa·s, more preferably from 1 mPa·s to 20 mPa·s, and still more preferably from 2 mPa·s to 15 mPa·s, and particularly preferably from 2 mPa·s to 10 mPa·s, from the viewpoint of the coagulation speed of the ink composition. Here, the viscosity is measured using a VIS- COMETER TV-22 (tradename, manufactured by TOKI SANGYO CO. LTD) at 20° C.

The surface tension of the treatment liquid is preferably from 20 mN/m to 60 mN/m, more preferably from 20 mN/m to 45 mN/m, and still more preferably from 25 mN/m to 40 mN/m, from the viewpoint of the coagulation speed of the ink composition. Here, the surface tension is measured using an automatic surface tensiometer CBVP-Z (tradename, manufactured by Kyowa Interface Science Co., Ltd.) at 25° C.

(Other Components)

In general, the treatment liquid of the invention may include a water-soluble organic solvent, in addition to the aggregating component. The treatment liquid may further include other various additives, as long as the effects of the invention are not impaired. The specifics of the water-soluble organic solvent are the same as the specifics of the above-described hydrophilic organic solvent in the ink composition.

Examples of other additives include a known additive such as an anti-drying agent (humectant), an anti-fading agent, an emulsion stabilizer, a penetration enhancing agent, a UV absorber, an antiseptic agent, an antimildew agent, a pH adjuster, a surface tension controller, an anti-foam agent, a viscosity adjuster, a dispersant, a dispersion stabilizer, an antirust agent, or a chelating agent. The additives described as specific examples of other additives contained in the ink composition in the above description may be used as other additives in the treatment liquid.

Image Forming Method

The image forming method of the invention includes: a treatment liquid application process of applying the treatment liquid, which is capable of causing formation of an aggregate when contacting with the inkjet ink composition of the invention, onto a recording medium; and an ink application process of applying the inkjet ink composition onto a recording medium to form an image. The image forming method may further include one or more other processes, as necessary.

In the following, the respective steps of the image forming method of the invention are described.

-Ink Application Process- In the ink application process, the inkjet ink composition of the invention described above is applied to a recording medium by an inkjet method. In this process, the ink composition can be applied selectively onto a recording medium, whereby a desired visual image can be formed. The specifics of the ink composition of the invention, such as the specifics of the components of the ink composition and preferable embodiments, are as described above.

Specifically, image formation employing an inkjet method may be performed by ejecting the treatment liquid onto a desired recording medium by application of energy, and the recording medium is, for example, a plain paper or a resin-coated paper, such as paper exclusively for inkjet recording, a film, paper that can be used both for inkjet recording and electrophotographic recording, cloth, glass, a metal, or ceramic, and examples thereof include those described in JP-A Nos. 8-169172, 8-27693, 2-276670, 7-276789, 9-323475, 62-238783, 10-153989, 10-217473, 10-235995, 10-337947, 10-217597, and 10-337947. An image forming method that is preferred in the invention is the method described in paragraphs [0093] to [0105] of JP-A No. 2003-306623.

The inkjet method is not particularly limited, and may be any known method such as a charge-control method in which ink is ejected by electrostatic attraction force; a drop-on-demand method (pressure-pulse method) in which a pressure of oscillation of a piezo element is utilized; an acoustic inkjet method in which ink is ejected by radiation pressure generated by irradiation of ink with acoustic beams that have been converted from electric signals; and a thermal inkjet method in which ink is ejected by a pressure generated by formation of bubbles caused by heating of ink (BUBBLEJET, registered trademark).

Further, examples of the inkjet method include a method in which a large number of small-volume droplets of an ink having a low optical density, which is called a photo ink, are ejected; a method in which inks having substantially the same hue but at different densities are used to improve image quality; and a method in which a clear and colorless ink is used.

The inkjet head used in an inkjet method may be either an on-demand type head or a continuous type head. Examples of ejection systems include electromechanical transduction systems (such as a single-cavity system, a double-cavity system, a vendor system, a piston system, a share-mode system and a shared-wall system), electrothermal transduction systems (such as a thermal inkjet system and a BUBBLE-JET (registered trademark) system), electrostatic suction systems (such as an electric-field-control system and a slit-jet system), and discharge systems (such as a spark jet system), and any of these ejection systems is applicable.

The ink nozzles and the like used for the inkjet recording are not particularly limited, and may be selected as appropriate according to applications.

Regarding the inkjet head, there are (i) a shuttle system in which recording is performed while a short serial head having a small length is moved in the width direction of a recording medium in a scanning manner, and (ii) a line system in which a line head having recording devices that are aligned to correspond to the entire length of one side of a recording medium is used. In the line system, image recording can be performed over the whole of one surface of a recording medium by moving the recording medium in a direction orthogonal to the direction along which the recording devices are aligned, and a conveyance system, such as carriage, which moves the short head in a scanning manner is unnecessary. Since a complicated scan-movement control of the movement of the carriage and the recording medium is unnecessary and only the recording medium is moved, the recording speed can be increased compared to the shuttle system. The image forming method of the invention can be applied to both of these systems; effects in improving the ejection accuracy and abrasion resistance of an image are larger when the image forming method of the invention is applied to a line system, in which dummy ejection is generally not performed.

In an embodiment, only one type of ink composition is used when recording is performed by the line system in the ink application process in the invention. In another embodiment, two or more types of ink composition are used when recording is performed by the line system in the ink application process, in such a manner that the interval between the ejection (ink spotting) of one ink composition (nth color ($n \geq 1$), for example the second color), and the ejection (ink spotting) of the next ink composition ((n+1)th color, for example the third color) is 1 second or less, thereby realizing favorable recording. In the invention, when the interval between each ejection in the line system recording is set to 1 second or less, an image which has excellent abrasion resistance and in which occurrence of blocking is suppressed can be obtained at higher speeds than before, while preventing bleed and intermingling of colors caused by interference between ink droplets. The image obtained may also have excellent hue and excellent printing properties (such as reproducibility of thin lines and fine portions in the image).

The ink amount per droplet ejected from the inkjet head is preferably from 0.5 pl to 6 pl, more preferably from 1 pl to 5 pl, and still more preferably from 2 pl to 4 pl, from the viewpoint of obtaining a high resolution image.

-Treatment Liquid Application Process-

In the treatment liquid application process, the treatment liquid capable of causing formation of an aggregate when contacting with the ink composition is applied to a recording medium, thereby contacting the treatment liquid with the ink composition. When the treatment liquid contacts with the ink composition, dispersed particles, such as polymer particles and a colorant (for example, a pigment), in the ink composition aggregate, as a result of which an image is fixed to the recording medium. The specifics and preferable embodiments of the components of the treatment liquid are as described above.

The application of the treatment liquid can be performed employing a known method such as a coating method, an inkjet method, or a dip method. The coating method may be a known coating method such as a method using a bar coater, an extrusion die coater, an air doctor coater, a blade coater, a rod coater, a knife coater, a squeeze coater, a reverse roll coater, or the like. The specifics of the inkjet method are as described above.

The treatment liquid application process may be conducted either before or after the ink application process in which the ink composition is used.

In the invention, it is preferable that the ink application process is conducted after the application of the treatment liquid performed in the treatment liquid application process. That is, it is preferable that the treatment liquid for aggregating a colorant (preferably a pigment) in the ink composition is applied onto the recording medium in advance of the application of the ink composition, and that the ink composition is applied so as to contact with the treatment liquid that has been applied onto the recording medium, thereby forming an image. Inkjet recording at higher speeds can be realized thereby, and an image having high density and high resolution can be obtained even when high-speed recording is performed.

The amount of the treatment liquid to be applied is not particularly limited as long as the treatment liquid is capable of coagulating the ink composition. The amount of the treatment liquid to be applied is preferably such an amount as to adjust the amount of aggregating component (such as a di- or higher-valent carboxylic acid or a cationic organic compound) applied to 0.1 g/m$^2$ or higher. The amount of the treatment liquid is more preferably such that the amount of the aggregating component applied is adjusted to be from 0.1 to 1.0 g/m$^2$, still more preferably such that the amount of the aggregating component applied is adjusted to be from 0.2 to 0.8 g/m$^2$. When the amount of the aggregating component applied is 0.1 g/m$^2$ or more, the aggregation reaction proceeds favorably. When the amount of the aggregating component applied is 1.0 g/m$^2$ or less, gloss is not excessively high; the prevention of excessive increase of gloss is preferable.

In the invention, it is preferable that the ink application process is conducted after the treatment liquid application process, and that a heat-drying process of drying the treatment liquid on the recording medium by heating is further conducted during a period from after the application of the treatment liquid onto the recording medium to the application of the ink composition. Drying of the treatment liquid by heating performed in advance of the ink application process realizes favorable ink application properties such as bleed prevention, and realizes recording of a visible image having excellent color density and excellent hue.

The drying by heating may be conducted by using a known heating device such as a heater, a blowing device such as a dryer, or a combination thereof. The heating may be performed according to, for example, a method of applying heat, by using a heater or the like, from a side of the recording medium opposite to the surface applied with the treatment liquid, a method of blowing warm or hot air to the surface of the recording medium applied with the treatment liquid, or a method of heating by using an infrared heater. Alternatively, two or more of these methods may be combined and used for the heating.

Thermal Fixing Process

The image forming method of the invention preferably includes, after the ink application process, a thermal fixing process of thermally fixing an ink image formed by the application of the ink composition by bringing the ink image into contact with a heating surface. The image on the recording medium is fixed through the thermal fixing process, and thus the abrasion resistance of the image is further improved.

The heating for the thermal fixing is preferably conducted at a temperature that is equal to or higher than the minimum film-formation temperature (MFT) of the polymer particles in the image. Heating to the MFT or higher temperature forms the polymer particles into a film, thereby strengthening the image. The heating temperature is preferably a temperature range that is no lower than the MFT. Specifically, the heating temperature is preferably in the range of from 40° C. to 80° C., more preferably from 50° C. to 75° C., and still more preferably from 55° C. to 70° C.

The minimum film-formation temperature (MFT) of the polymer particles is controlled by the Tg of the polymer, and the type and amount of the ink solvent. There is a general tendency for the MFT to be decreased by any of a decrease in the Tg, a decrease in the I/O value of the ink solvent, or an increase in the amount of the ink solvent.

If a pressure is applied while heating, the pressure is preferably in the range of from 0.1 MPa to 3.0 MPa, more preferably from 0.1 MPa to 1.0 MPa, and still more preferably from 0.1 MPa to 0.5 MPa, from the viewpoint of smoothing the surface.

The method of heating is not particularly limited, and preferable examples thereof include a noncontact drying method, such as a method of heating with a heat generator such as a NICHROME wire heater, a method of supplying warm or hot air, or a method of heating with a halogen lamp, an infrared lamp, or the like. The method of applying a heat and a pressure is not particularly limited, and preferable examples thereof include a contact thermal fixing method, such as a method of pressing a hot plate against an image-formed surface of the recording medium, a method in which a heat-pressurization apparatus is used to pass the recording medium through a pressure contact portion, wherein the heat-pressurization apparatus may have a pair of heat-pressurization rollers or a pair of heat-pressurization belts, or may have a heat-pressurization belt disposed at the image-recorded surface of the recording medium and a support roller disposed at the opposite side of the recording medium. The pressure contact portion is thus formed between the pair of rollers or between the pair of heat-pressurization belts or between the heat-pressurization belt and the support roller.

When applying a heat and a pressure, the nip time is preferably from 1 msec to 10 sec, more preferably from 2 msec to 1 sec, and still more preferably from 4 msec to 100 msec. The nip width is preferably from 0.1 mm to 100 mm, more preferably from 0.5 mm to 50 mm, and still more preferably from 1 mm to 10 mm.

The heat-pressurization roller may be a metal roller made of metal, or a roller having a metal core of which outer surface is covered with a coating layer made of an elastic material and, optionally, a surface layer (also referred to as a release layer). The metal core may be, for example, a cylindrical body made of iron, aluminum, or SUS (stainless steel). It is preferable that at least a part of the surface of the metal core is coated with a coating layer. The coating layer is preferably formed by a silicone resin or fluororesin, each of which has release properties. It is preferable that a heat generator is built into the interior of the metal core of one of the heat-pressurization rollers. A heat treatment and a pressurization treatment may be performed simultaneously by passing the recording medium between the rollers. In an embodiment, the recording medium is heated by being nipped between two heating rollers, if necessary. Preferable examples of the heat generator include a halogen lamp heater, a ceramic heater, and a NICHROME wire.

The belt substrate of a heat-pressurization belt used in a heat-pressurization apparatus is preferably a seamless nickel electric brass, and the thickness of the substrate is preferably from 10 μm to 100 μm. Examples of the material of the belt substrate include aluminum, iron and polyethylene, in addition to nickel. When a silicone resin or a fluororesin is applied, the thickness of the layer formed by the resin is preferably from 1 μm to 50 μm, and more preferably from 10 μm to 30 μm.

In order to obtain a pressure (nip pressure) within the above range, elastic members that exhibit tension, such as a spring, may be selected and disposed at both ends of the roller (for example, a heat-pressurization roller), such that a desired nip pressure is obtained in consideration of the nip gap.

The conveyance speed of the recording medium when using a heat-pressurization roller or a heat-pressurization belt is preferably from 200 mm/sec to 700 mm/sec, more preferably from 300 mm/sec to 650 mm/sec, and still more preferably from 400 mm/sec to 600 mm/sec.

- Recording Medium-

According to the image forming method of the invention, an image is recorded on a recording medium.

The recording medium is not particularly limited, and may be a cellulose-based general printing paper, such as high-quality paper, coat paper, or art paper, that is used for general offset printing and the like. When image recording is performed on the cellulose-based general printing paper by a general inkjet method using an aqueous ink, absorption and drying of the ink is relatively slow, colorant migration easily occurs after ink spotting, and image quality tends to lower. In contrast, according to the image forming method of the invention, recording of a high-quality image having excellent color density and excellent hue is achieved while suppressing the migration of the colorant.

The recording medium may be a commercially-available product, and examples thereof include high-quality papers (A) such as PRINCE WOOD FREE (tradename) manufactured by Oji Paper Co., Ltd., SHIRAOI (tradename) manufactured by Nippon Paper Industries Co., Ltd., and New NPI jo-shitsu (New NPI high-quality; tradename) manufactured by Nippon Paper Industries Co., Ltd.; very light-weight coated papers such as EVER LIGHT COATED (tradename) manufactured by Oji Paper Co., Ltd. and AURORA S (tradename) manufactured by Nippon Paper Industries Co., Ltd.; lightweight coat papers (A3) such as TOPKOTE (L) (tradename) manufactured by Oji Paper Co., Ltd. and AURORA L (tradename) manufactured by Nippon Paper Industries Co., Ltd.; coat papers (A2, B2) such as TOPKOTE PLUS (tradename) manufactured by Oji Paper Co., Ltd. and AURORA COAT (tradename) manufactured by Nippon Paper Industries Co., Ltd.; and art papers (A1) such as 2/SIDE GOLDEN CASK GLOSS (tradename) manufactured by Oji Paper Co., Ltd. and TOKUBISHI ART (tradename) manufactured by Mitsubishi Paper Mills Ltd. As the recording medium, various inkjet-recording papers exclusively for photos may be used.

Among them, a recording medium having a water absorption coefficient Ka of from 0.05 $mL/m^2 \cdot ms^{1/2}$ to 0.5 $mL/m^2 \cdot ms^{1/2}$ is preferable, a recording medium having a water absorption coefficient Ka of from 0.1 $mL/m^2 \cdot ms^{1/2}$ to 0.4 $mL/m^2 \cdot ms^{1/2}$ is more preferable, and a recording medium having a water absorption coefficient Ka of from 0.2 $mL/m^2 \cdot ms^{1/2}$ to 0.3 $mL/m^2 \cdot ms^{1/2}$ is still more preferable, from the viewpoints of obtaining large effects in suppression of colorant migration and obtaining a high-quality image having more favorable color density and hue than before.

The water absorption coefficient Ka has the same definition as that described in JAPAN TAPPPI Pulp and Paper Testing Method No. 51: 2000 (published by JAPAN TAPPI). Specifically, the water absorption coefficient Ka is calculated from a difference in water transfer amount between a contact time of 100 ms and a contact time of 900 ms that are measured using an automatic scanning liquid absorptometer KM500win (manufactured by KUMAGAI RIKI KOGYO CO., LTD.).

Among the recording media, coated paper, which is used for general offset printing, is preferable. The coated paper is produced generally by coating a surface of cellulose-based paper (such as high-quality paper or neutral paper) that has not been subjected to surface treatment, with a coating material so as to form a coating layer. When image forming is performed by usual aqueous inkjet, the coated paper tends to produce problems in quality, for example in image gloss or abrasion resistance. However, unevenness in gloss is suppressed and an image having excellent gloss and excellent abrasion resistance can be obtained according to the image forming method of the invention even when the coated paper is used. In particular, it is preferable to use a coated paper having base paper and a coated layer including kaolin and/or calcium bicarbonate. Specifically, art paper, coat paper, lightweight coat paper, or very light-weight coat paper is preferable.

<Recorded Material>

The recorded material of the invention is obtained by recording on a recording medium by the image forming method of the invention. Thus, an image-recorded material (such as an inkjet-recorded material) which has high resolution, high abrasion resistance, and excellent blocking resistance can be obtained even when recorded at high speeds.

EXAMPLES

The present invention is described in further detail below by reference to examples. However, the examples should not be construed as limiting the scope of the invention. Hereinafter, "part(s)" and "%" are based on mass, unless otherwise specified.

In the following, weight average molecular weights were measured using a gel permeation chromatography (GPC). The GPC was performed using a GPC instrument, HLC-8220GPC manufactured by Tosoh Corporation, three serially-connected columns of TSKGEL SUPER HZM-H, TSKGEL SUPER HZ4000, and TSKGEL SUPER HZ2000 (tradenames, all manufactured by Tosoh Corporation), and THF (tetrahydrofuran) as an eluent. Regarding the GPC conditions, the sample concentration was 0.35%, the flow rate was 0.35 ml/min, the sample injection amount was 10 μA, and the measurement temperature is 40° C. The detection was performed by using a refractive index detector. The calibration curve was determined from the following eight standard samples: TSK STANDARD POLYSTYRENEs of F-40, F-20, F-4, F-1, A-5000, A-2500, A-1000, and n-propylbenzene, all manufactured by Tosoh Corporation.

Example 1

<Preparation of Inkjet Ink>
~Preparation of Self-Dispersing Polymer Particles B-01~

560.0 g of methyl ethyl ketone was placed in a 2 L three-necked flask equipped with an agitator, a thermometer, a reflux condenser, and a nitrogen gas introduction tube, and the temperature of the methyl ethyl ketone was increased to 87° C. Thereafter, a mixed solution of 220.4 g of methyl methacrylate, 301.6 g of isobornyl methacrylate, 58.0 g of methacrylic acid, 108 g of methyl ethyl ketone, and 2.32 g of an azo polymerization initiator V-601 (tradename, manufactured by Wako Pure Chemical Industries Co., Ltd.) was dripped into the flask at a constant rate while the inside of the reaction container (flask) was maintained at a reflux condition (the reflux condition was maintained also in subsequent operations until the completion of the reaction), such that the dripping was completed in 2 hours. After the completion of the dripping, the contents of the flask were agitated for one hour. Then, an operation of adding a solution of 1.16 g of V-601 (tradename) in 6.4 g of methyl ethyl ketone to the flask and agitating the contents of the flask for 2 hours was conducted, and then this operation was repeated four times. Thereafter, a solution of 1.16 g of V-601 (tradename) in 6.4 g of methyl ethyl ketone was further added thereto, and the contents of the flask were further agitated for 3 hours. After completion of a polymerization reaction, the temperature of the solution was decreased to 65° C., and 163.0 g of isopropanol was added thereto. The resultant solution was allowed to cool down. The weight average molecular weight (Mw) of the obtained copolymer was 63,000, and the acid value of the obtained copolymer was 65.1 mgKOH/g.

Subsequently, 317.3 g of the obtained copolymer solution (having a solid concentration of 41.0%) were weighed out, and 46.4 g of isopropanol, 1.65 g of a 20% maleic anhydride solution (water-soluble acidic compound of which amount is, if calculated as an amount of maleic acid, 0.3% relative to the copolymer), and 40.77 g of a 2 mol/L NaOH aqueous solution were added thereto, and the temperature inside the reaction container was raised to 70° C. Then, 380 g of distilled water was dripped at a rate of 10 ml/min, thereby causing the resultant mixture to form an aqueous dispersion (a dispersing process).

Subsequently, the aqueous dispersion contained in the reaction container was left to stand for 1.5 hours under reduced pressure at a reaction container internal temperature of 70° C., thereby distilling off the isopropanol, methyl ethyl ketone, and water in a total amount of 287.0 g (a solvent removal process). 0.278 g of PROXEL GXL(S) (tradename, manufactured by Arch Chemicals Japan Inc.), which amount corresponds to a benzoisothiazoline-3-one amount of 440 ppm relative to the polymer solid content, were added to the dispersion. The dispersion was then filtered through a 1 μm filter, and the filtrate was collected to obtain an aqueous dispersion of self-dispersing polymer particles B-01 having a solid concentration of 26.5%. The obtained self-dispersing polymer particles were diluted with ion-exchange water to form a 25.0% dispersion liquid, and the properties of the 25.0% dispersion liquid were measured, as a result of which the 25.0% dispersion liquid was found to have a pH of 7.8, an electric conductivity of 461 mS/m, a viscosity of 14.8 mPa·s, and a volume average particle diameter of 2.8 nm.

<Measurement of Glass Transition Temperature Tg>

The glass transition temperature of the self-dispersing polymer particles (B-01) obtained was measured by the following method, as a result of which the glass transition temperature was found to be 160° C.

Specifically, an amount of the polymer solution after polymerization, which corresponds to a solid amount of 0.5 g, was taken out, and dried at 50° C. for 4 hours under reduced pressure, thereby providing a polymer solid matter. The glass transition point Tg of the polymer was measured with a differential scanning calorimeter (DSC) EXSTAR6220 manufactured by SII NanoTechnology Inc., using the obtained polymer solid matter. With regard to the measurement conditions, 5 mg of the sample was placed in an aluminum pan, and the aluminum pan was tightly sealed. The measurement was conducted under nitrogen atmosphere according to the following temperature profile:

30° C.→−50° C. (temperature decrease at a rate of 50° C./min)
−50° C.→120° C. (temperature increase at a rate of 20° C./min)
120° C.→−50° C. (temperature decrease at a rate of 50° C./min)
−50° C.→120° C. (temperature increase at a rate of 20° C./min)

The peak top value of the DSC measurement data of the second temperature increase step was considered as Tg.

<Measurement of Volume Average Particle Diameter Mv>

The obtained aqueous dispersion of the self-dispersing polymer particles was appropriately diluted to a concentration suitable for measurement (such that the loading index was in the range of from 0.1 to 10), and the volume average particle diameter was measured by a dynamic light diffraction method using a ultrafine particle size distribution measurement instrument NANOTRAC UPA-EX150 (tradename, manufactured by NIKKISO CO., LTD.). The measurement of the volume average particle diameter of each aqueous dispersion was conducted under the same measurement condition. Specifically, the measurement was conducted at the following setting parameters:

Particle transparency: transparent
Particle refraction index: 1.51
Particle shape: non-spherical
Density: 1.2 g/cm$^3$
Solvent: water
Cell temperature: from 18° C. to 25° C.

The following self-dispersing polymer particles (B-01a) to (B-01h) and (B-02) to (B-07) described in Table 1 were prepared in the same manner as the preparation of the self-dispersing polymer particles (B-01).

~Synthesis of Resin Dispersant P-1~

88 g of methyl ethyl ketone were added into a 1,000 ml three-necked flask equipped with an agitator and a condenser tube, and was heated to 72° C. under nitrogen atmosphere. A solution of 0.85 g of dimethyl-2,2'-azobisisobutyrate, 50 g of phenoxyethyl methacrylate, 11 g of methacrylic acid, and 39 g of methyl methacrylate dissolved in 50 g of methyl ethyl ketone was dripped into the flask over 3 hours. After completion of the dripping, the contents of the flask were allowed to further react for 1 hour, and then a solution of 0.42 g of dimethyl-2,2'-azobisisobutyrate dissolved in 2 g of methyl ethyl ketone was added thereto. The contents of the flask were heated to 78° C., and maintained at that temperature for 4 hours. Methyl ethyl ketone was added to the reaction liquid obtained, as a result of which a 36.8% solution of a copolymer of phenoxyethyl methacrylate/methyl methacrylate/methacrylic acid at a copolymerization ratio, in terms of mass %, of 50/39/11 (resin dispersant P-1) in methyl ethyl ketone was obtained.

The composition of the obtained resin dispersant P-1 was confirmed by $^1$H-NMR, and the weight average molecular weight (Mw) thereof as measured by GPC was 49,400. Further, the acid value of the polymer as determined by the method described in the JIS Standard (specifically, JIS K 0070:1992) was 71.7 mgKOH/g. The Tg of the resin dispersant P-1 was found to be 94° C.

~Synthesis of Resin Dispersant P-2~

240 g of methyl ethyl ketone, 30 g of a mixture of N-(4-vinylbenzyl)-10H-acridine-9-one and N-(3-vinylbenzyl)-10H-acridine-9-one (in a weight ratio of 1/1), 20 g of methacrylic acid, and 150 g of ethyl methacrylate were added into a 1,000 ml three-necked flask equipped with an agitator and a condenser tube, and were heated to 75° C. under nitrogen atmosphere. A solution of 2.44 g of dimethyl-2,2'-azobisisobutyrate dissolved in 16 g of methyl ethyl ketone was added thereto.

The contents of the flask were agitated while maintained at the above temperature, thereby further reacting for 2 hours. Thereafter, a solution of 1.0 g of dimethyl-2,2'-azobisisobutyrate in 2 g of methyl ethyl ketone was added thereto, and the contents of the flask were allowed to react for another 2 hours. Then, a solution of 1.0 g of dimethyl-2,2'-azobisisobutyrate in 2 g of methyl ethyl ketone was added again, and the contents of the flask were heated to 80° C. and maintained at that temperature for 4 hours.

Methyl ethyl ketone was added to the reaction liquid obtained, as a result of which a solution of a copolymer of (a mixture of N-(4-vinylbenzyl)-10H-acridine-9-one and N-(3-vinylbenzyl)-10H-acridine-9-one in a weight ratio of 1:1)/ethyl methacrylate/methacrylic acid at a copolymerization ratio by mass of 15/75/10 (resin dispersant P-2) in methyl ethyl ketone was obtained. The Tg of the resin dispersant P-2 was measured, and was found to be 124° C.

A part of the solution obtained was dried off by heating under reduced pressure, thereby determining the content of nonvolatile components, which was found to be 36.8%.

The composition of the obtained resin dispersant P-2 was confirmed by $^1$H-NMR, and the weight average molecular weight (Mw) thereof as measured by GPC was 44,200. Further, the acid value of the polymer as determined by the above method was 65.2 mgKOH/g.

(Preparation of Cyan Pigment Dispersion C)

The following components were pre-dispersed using a high-speed agitator DISPER (tradename) and treated for 8 passes by a disperser (MICROFLUIDIZER M-140K (tradename) manufactured by Microfluidics Corporation) at 150 MPa: 100 g (as a pigment solid amount) of Pigment Blue 15:3 (phthalocyanine blue A220 wet cake having a pigment solid content of 33.5% and manufactured by Dainichiseika Color and Chemicals Mfg. Co., Ltd.) as a pigment, 45 g (as a solid amount) of the above copolymer of phenoxyethyl methacrylate/methyl methacrylate/methacrylic acid (resin dispersant P-1), 140 g of methyl ethyl ketone, 50.6 g of 1 mol/L sodium hydroxide aqueous solution as a pH adjuster (the amount of which corresponds to a neutralization degree of 88% by mol relative to the methacrylic acid), and 331 g of ion-exchange water.

Subsequently, the methyl ethyl ketone was removed from the obtained dispersion at 56° C. under reduced pressure, and a part of water was further removed. Thereafter, the dispersion was subjected to a centrifugation treatment at 8,000 rpm for 30 minutes using a high-speed cooling centrifuge 7550 manufactured by KUBOTA Manufacturing Corporation and a 50 mL centrifuge tube, thereby collecting a supernatant liquid other than precipitates.

Subsequently, the dispersion obtained (the supernatant liquid) was heated at 70° C. for 4 hours, and 2-methyl-4-isothiazoline-3-one, 5-chloro-2-methyl-isothiazoline-3-one, 2-bromo-2-nitropropane-1,3-diol, 4,4-dimethyloxazolidine, 1,2-benzisothiazoline-3-one, and 2-n-octyl-4-isothiazoline-3-one were added thereto as preservative agents, such that the concentration of the 2-methyl-4-isothiazoline-3-one, 5-chloro-2-methyl-isothiazoline-3-one, 2-bromo-2-nitropropane-1,3-diol, 4,4-dimethyloxazolidine, 1,2-benzisothiazoline-3-one, and 2-n-octyl-4-isothiazoline-3-one in the resultant liquid were 80 ppm, 40 ppm, 10 ppm, 30 ppm, 80 ppm, and 30 ppm, respectively. Then, the dispersion liquid was filtered, and the filtrate was collected.

Thereafter, the pigment concentration was determined from the absorption spectrum thereof, and a resin-coated pigment particle dispersion (cyan pigment dispersion C) having a pigment concentration of 15% was obtained. The dispersion obtained was found to have a particle diameter of 88 nm, a pH of 8.5, and a viscosity of 2.9.

(Preparation of Yellow Pigment Dispersion Y)

The following components were pre-dispersed using a high-speed agitator DISPER (tradename) and treated for 8 passes by a disperser (MICROFLUIDIZER M-140K (tradename) manufactured by Microfluidics Corporation) at 150 MPa: 100 g of Pigment Yellow 74 (Fast Yellow FG manufactured by Sanyo Color Works Ltd.) as a pigment, 42 g (as a solid amount) of the copolymer of phenoxyethyl methacrylate/methyl methacrylate/methacrylic acid (resin dispersant P-1), 108 g of methyl ethyl ketone, 47.2 g of 1 mol/L sodium hydroxide aqueous solution (the amount of which corresponds to a neutralization degree of 88% by mol relative to the methacrylic acid) as a pH adjuster, and 369.5 g of ion-exchange water. The dispersion obtained was filtered through a filter having a pore diameter of 1 μm, and the filtrate was collected.

Subsequent processes are performed in the same manner as in the preparation of the cyan pigment dispersion C, as a result of which a resin-coated pigment particle dispersion (yellow pigment dispersion Y) having a pigment concentration of 15% was obtained. The obtained dispersion was found to have a particle diameter of 91 nm, a pH of 8.6, and a viscosity of 3.2 mPa·s.

(Preparation of Black Pigment Dispersion K)

The following components were pre-dispersed using a high-speed agitator DISPER (tradename) and dispersed using a bead mill disperser with zirconia beads having a diameter of 0.1 mm: 100 g of carbon black (#2600 manufactured by Mitsubishi Chemical Corporation) as a pigment, 57 g (as a solid amount) of the copolymer of phenoxyethyl methacrylate/methyl methacrylate/methacrylic acid (resin dispersant P-1), 155.8 g of methyl ethyl ketone, 80.8 g of 1 mol/L sodium hydroxide aqueous solution (the amount of which corresponds to a neutralization degree of 110% by mol relative to the methacrylic acid) as a pH adjuster, and 491 g of ion-exchange water. After the dispersing operation, the dispersion obtained was filtered through a filter having a pore diameter of 1 μm, and the filtrate was collected.

Subsequent processes are performed in the same manner as in the preparation of the cyan pigment dispersion C, as a result of which a resin-coated pigment particle dispersion (black pigment dispersion K) having a pigment concentration of 15% was obtained. The obtained dispersion was found to have a particle diameter of 73 nm, a pH of 8.4, and a viscosity of 3.9 mPa·s.

obtained was filtered through a filter having a pore diameter of 1 μm, and the filtrate was collected.

Subsequent processes are performed in the same manner as in the preparation of the cyan pigment dispersion C, as a result of which a resin-coated pigment particle dispersion (magenta pigment dispersion M) having a pigment concentration of 15% was obtained. The obtained dispersion was found to have a particle diameter of 76 nm, a pH of 8.6, and a viscosity of 2.8 mPa·s.

~Preparation of Cyan Ink~

Ingredients, including the cyan pigment dispersion C obtained above and the self-dispersing polymer particles B-01, were mixed so as to provide the ink composition described below. The resultant mixture was filled into a plastic disposable syringe, and was filtered through a PVDF 5 μm filter (MILLEX-SV (tradename) having a diameter of 25 mm and manufactured by Millipore Corporate), as a result of which a cyan ink (inkjet ink composition) C-01 was obtained.

-Composition of Cyan Ink-

| | |
|---|---|
| Cyan pigment (Pigment Blue 15:3): | 2.5% |
| Resin dispersant P-1 described above (as a solid amount): | 1.125% |
| Self-dispersing polymer particles B-01 described above (as a solid amount): | 8.5% |
| SANNIX (NEWPOL) GP250 (hydrophilic organic solvent having an I/O value of 1.30) (tradename, manufactured by Sanyo Chemical Industries Ltd.): | 8% |
| Tripropyleneglycol monomethyl ether (TPGmME) (hydrophilic organic solvent having an I/O value of 0.80) (MFTG (tradename) manufactured by Nippon Nyukazai Co., Ltd.): | 8% |
| Urea (solid moistening agent, manufactured by Nissan Chemical Industries Ltd.): | 5% |
| NEWPOL PE-108 (thickening agent) (tradename, manufactured by Sanyo Chemical Industries Ltd.): | 0.15% |
| OLFINE E1010 (surfactant) (tradename, manufactured by Nissin Chemical Industry Co., Ltd.): | 1% |
| Ion-exchange water: | Remainder |

(Preparation of Magenta Pigment Dispersion M)

The following components were pre-dispersed using a high-speed agitator DISPER (tradename) and treated for 10 passes by a disperser (MICROFLUIDIZER M-140K (tradename) manufactured by Microfluidics Corporation) at 150 MPa: 100 g of Pigment Red 122 (Cromophtal Jet Magenta DMQ manufactured by Ciba Japan) as a magenta pigment, 30 g (as a solid amount) of the resin dispersant P-2, 133 g of methyl ethyl ketone, 27.2 g of 1 mol/L sodium hydroxide aqueous solution (the amount of which corresponds to a neutralization degree of 78% by mol relative to the methacrylic acid), and 424 g of ion-exchange water. The dispersion Cyan inks C-02 to C-15 were prepared in the same manner as the preparation of the cyan ink C-01, except that the self-dispersing polymer particles used in the preparation of the cyan ink C-01 was replaced by the self-dispersing polymer particles shown in Table 1.

~Preparation of Magenta Ink~

A magenta ink (inkjet ink composition) M-01 was prepared in the same manner as the preparation of the cyan ink C-01, except that the magenta pigment dispersion M obtained above was used instead of the cyan pigment dispersion C, and that the ink composition was changed to the following composition.

- Composition of Magenta Ink-

| | |
|---|---|
| Magenta pigment (Pigment Red 122): | 5.0% |
| Resin dispersant P-2 described above (as a solid amount): | 1.5% |
| Self-dispersing polymer particles B-01 described above (as a solid amount): | 7.25% |
| SANNIX (NEWPOL) GP250 (hydrophilic organic solvent having an I/O value of 1.30) (tradename, manufactured by Sanyo Chemical Industries Ltd.): | 10% |
| Tripropyleneglycol monomethyl ether (TPGmME) (hydrophilic organic solvent having an I/O value of 0.80) (MFTG (tradename) manufactured by Nippon Nyukazai Co., Ltd.): | 6% |
| Urea (solid moistening agent, manufactured by Nissan Chemical Industries Ltd.): | 5% |
| NEWPOL PE-108 (thickening agent) (tradename, manufactured by Sanyo Chemical Industries Ltd.): | 0.05% |
| OLFINE E1010 (surfactant) (tradename, manufactured by Nissin Chemical Industry Co., Ltd.): | 1% |
| Ion-exchange water: | Remainder |

~Preparation of Yellow Ink~

A yellow ink (inkjet ink composition) Y-01 was prepared in the same manner as the preparation of the cyan ink C-01, except that the yellow pigment dispersion Y obtained above was used instead of the cyan pigment dispersion C, and that the ink composition was changed to the following composition.

-Composition of Yellow Ink-

| | |
|---|---|
| Yellow pigment (Pigment Yellow 74): | 4.0% |
| Resin dispersant P-1 described above (as a solid amount): | 1.7% |
| Self-dispersing polymer particles B-01 described above (as a solid amount): | 7% |
| SANNIX (NEWPOL) GP250 (hydrophilic organic solvent having an I/O value of 1.30) (tradename, manufactured by Sanyo Chemical Industries Ltd.): | 8% |
| Tripropyleneglycol monomethyl ether (TPGmME) (hydrophilic organic solvent having an I/O value of 0.80) (MFTG (tradename) manufactured by Nippon Nyukazai Co., Ltd.): | 8% |
| Urea (solid moistening agent, manufactured by Nissan Chemical Industries Ltd.): | 5% |
| NEWPOL PE-108 (thickening agent) (tradename, manufactured by Sanyo Chemical Industries Ltd.): | 0.15% |
| OLFINE E1010 (surfactant) (tradename, manufactured by Nissin Chemical Industry Co., Ltd.): | 1% |
| Ion-exchange water: | Remainder |

~Preparation of Black Ink~

A black ink (inkjet ink composition) K-01 was prepared in the same manner as the preparation of the cyan ink C-01, except that the black pigment dispersion K obtained above was used instead of the cyan pigment dispersion C, and that the ink composition was changed to the following composition.

-Composition of Black Ink-

| | |
|---|---|
| Carbon black: | 4.0% |
| Resin dispersant P-1 described above (as a solid amount): | 2.3% |
| Self-dispersing polymer particles B-01 described above (as a solid amount): | 5.2% |
| SANNIX (NEWPOL) GP250 (hydrophilic organic solvent having an I/O value of 1.30) (tradename, manufactured by Sanyo Chemical Industries Ltd.): | 10% |
| Tripropyleneglycol monomethyl ether (TPGmME) (hydrophilic organic solvent having an I/O value of 0.80) (MFTG (tradename) manufactured by Nippon Nyukazai Co., Ltd.): | 6% |
| Urea (solid moistening agent, manufactured by Nissan Chemical Industries Ltd.): | 5% |
| NEWPOL PE-108 (thickening agent) (tradename, manufactured by Sanyo Chemical Industries Ltd.): | 0.3% |
| OLFINE E1010 (surfactant) (tradename, manufactured by Nissin Chemical Industry Co., Ltd.): | 1% |
| Ion-exchange water: | Remainder |

<Preparation of Treatment Liquid>

A treatment liquid was prepared as described below. The measurement of viscosity and surface tension was performed by the same method as above.

~Preparation of Treatment Liquid T-1~

Ingredients were mixed to have the following treatment liquid composition, whereby a treatment liquid was obtained. With regard to properties of the treatment liquid, the treatment liquid was found to have a viscosity of 2.6 mPa·s, a surface tension of 37.3 mN/m, and a pH of 1.6 (25° C.).

-Composition of Treatment Liquid-

| | |
|---|---|
| Malonic acid (divalent carboxylic acid, manufactured by Wako Pure Chemical Industries Ltd.): | 15.0% |
| Diethyleneglycol monomethyl ether (manufactured by Wako Pure Chemical Industries Ltd.): | 20.0% |
| N-oleoyl-N-methyltaurine sodium salt (surfactant): | 1.0% |
| Ion-exchange water: | 64.0% |

<Method for Measuring Ink Viscosity and Evaluation>

-Evaluation of Viscosity-

The viscosity of each inkjet ink composition at 25° C. was measured using an E-type viscometer (manufactured by Toki Sangyo Co., Ltd.), and evaluated according to the following criteria. The results are shown in Table 1.

Rank A is at an acceptable level, rank B is practically tolerable level, and rank C is practically intolerable with respect to ejection.

~Evaluation Criteria~

A: 5.0 mPa·s or more
B: 4.7 mPa·s to less than 5.0 mPa·s
C: less than 4.7 mPa·s

<Image Forming Method and Evaluation>

A GELJET GX5000 printer head manufactured by Ricoh Company Ltd. was prepared, and the contents of a storage tank connected thereto were replaced by an ink to be tested among the inks obtained above. A sheet of double-sided TOKUBISHI ART N (tradename) paper manufactured by Mitsubishi Paper Mills Ltd. as a recording medium, having a basis weight of 104.7 g/m$^2$, was fixed onto a stage that was movable in a predetermined linear direction at 500 mm/sec, and the temperature of the stage was maintained at 30° C. The treatment liquid T-1 obtained above was applied, at a thickness of about 1.2 μm, to the recording medium using a bar coater, and was dried at 50° C. for 2 seconds directly after the application.

Thereafter, the GELJET GX5000 printer head was set and fixed such that the direction of the alignment of the nozzles of the line head (main scanning direction) forms an angle of 75.7 degrees with a direction that is orthogonal to the movement direction of the stage (sub-scanning direction), and a cyan solid image was printed by ejection in a line ejection manner at ejection conditions of an ink amount per droplet of 4.8 pL, an ejection frequency of 24 kHz, and a resolution of 1,200 dpi×1,200 dpi while moving the recording medium at a constant velocity in the sub-scanning direction.

Directly after printing, the printed image was dried at 60° C. for 3 seconds using a drier, and a fixing treatment whereby the recording medium was passed between a pair of fixing rollers heated to 60° C. at a nip pressure of 0.25 MPa and a nip width of 4 mm was conducted, as a result of which an evaluation sample was prepared.

(Evaluation of Blocking 1)

Two paper pieces each having a size of 3.5 cm×4 cm were cut out from the evaluation sample obtained above, and the paper pieces were placed on a 10 cm×10 cm acrylic board such that the printed faces of the respective paper pieces faced each other. Ten pieces of double-sided TOKUBISHI ART N (tradename, manufactured by Mitsubishi Paper Mills Ltd.) paper, on which printing had not been conducted and each of which had been cut to have the same size as above, were further superposed on the stacked two paper pieces of the evaluation sample. A 10 cm×10 cm acrylic board was further superposed thereon, and the stacked paper pieces were allowed to stand in this state in an atmospheric condition of 60° C. and 30% RH (relative humidity) for 12 hours.

After the standing, a 1 kg weight (which corresponds to a load of 700 kg/m$^2$) was placed on the top acrylic board, and the stacked paper pieces were allowed to stand for further 24 hours in an atmospheric condition of 60° C. and 30% RH.

Then the stacked paper pieces were stored in an environment of 60° C. and 30% RH for 2 hours. Thereafter, the unprinted TOKUBISHI ART N (tradename) paper pieces, which were superposed on the paper pieces of the evaluation sample, were removed, and the stacked paper pieces of the evaluation sample were separated from each other. At this time, the ease of separation and the presence of residual paper material adhered to the printed faces were observed with the naked eyes, and were evaluated according to the following criteria.

~Evaluation Criteria~

A: Adhered residual paper material was not observed on the printed faces even under a microscope at a 50-fold magnification.

B: Adhered residual paper material was not observed on the printed faces with the naked eyes, but was observed under a microscope at a 50-fold magnification.

C: Adhered residual paper material was observed on the printed faces with the naked eyes.

(Evaluation of Blocking 2)

The same procedures as those in the evaluation of blocking 1 were adopted, except for changing the environmental condition of 60° C. and 30% RH employed in both of the standing for 12 hours and the storage for 2 hours was changed to an environmental condition of 70° C. and 20% RH. Evaluation was conducted according to the same criteria as the criteria employed in the evaluation of blocking 1.

(Evaluation of Ejection Response: Latency)

A GELJET GX5000 printer head was fixed such that the direction of the alignment of the nozzles of the line head (main scanning direction) is orthogonal to the movement direction of the stage (sub-scanning direction).

The contents of a storage tank connected to the printer head were replaced by an ink to be tested among the inks obtained above. A sheet of a recording medium, KASSAI Photofinish Pro manufactured by FUJIFILM Corporation, was attached to the stage, which is capable of moving in a direction (sub-scanning direction) that is orthogonal to the nozzle alignment direction of the printer head (main scanning direction).

Then, ejection of ink droplets was performed 400 times at an ink volume per droplet of 3.4 pL, an ejection frequency of 24 kHz, and a resolution of 150 dpi in the stage conveyance direction, while the stage was moved in the conveyance direction (sub-scanning direction) at a velocity of 508 mm/sec. The printer head has nozzles that are aligned in two rows, and each of the two rows has 192 nozzles at 150 npi. During the above ejection process, only 10 consecutive nozzles, among the 192 nozzles, of one of the rows was used for ejection. Thereafter, ejection of ink droplets from the 192 nozzles of the one row was performed 1,000 times at a resolution of 1,200 dpi in the conveyance direction, whereby initial printing (formation of an initially-formed image) was completed.

Directly after the initial printing, the stage was returned to the initial position. One minute after the ejection for the last dot in the initial printing, ejection of ink droplets from 10 consecutive nozzles that are adjacent to the 10 consecutive nozzles used in the initial printing was started and performed 400 times at a resolution of 150 dpi in the stage conveyance direction. The obtained image may be hereinafter referred to as "1-minute image", as opposed to the initially-formed image.

The positions of dots in the initially-formed image formed by the ejection from the nozzles that were used first in the formation of the initial image were observed under a microscope at a 50-fold magnification. The positions of dots in the 1-minute image formed by the ejection from the adjacent 10 nozzles were also observed under the microscope at a 50-fold magnification, were compared with the positions of the above dots in the initially-formed image, and were evaluated as follows.

~Evaluation Criteria~

A: Deviation of the positions of dots in the 1-minute image in the conveyance direction, as compared with the positions of dots in the initially-formed image, was not observed.

B: The positions of dots in the 1-minute image were found to deviate by less than 30 μm in the conveyance direction, as compared with the positions of dots in the initially-formed image.

C: The positions of dots in the 1-minute image were found to deviate by at least 30 μm in the conveyance direction, as compared with the positions of dots in the initially-formed image, or the ejection for forming the first dot in the 1-minute image failed.

(Ejectability Maintenance Property Evaluation: Evaluation Based on Dummy Jet)

A GELJET GX5000 printer head was fixed such that the direction of the alignment of the nozzles of the line head (main scanning direction) is orthogonal to the movement direction of the stage (sub-scanning direction). The contents of a storage tank connected to the printer head were replaced by an ink to be tested among the inks obtained above.

A sheet of a recording medium, KASSAI Photofinish Pro manufactured by FUJIFILM Corporation, was attached to the stage, which was capable of being moved in a direction (sub-scanning direction) that is orthogonal to the nozzle alignment direction of the printer head (main scanning direction).

Then, ejection of ink droplets was performed at an ink volume per droplet of 3.4 pL, an ejection frequency of 10 kHz, a resolution of 75 dpi in the nozzle alignment direction, and a resolution of 1,200 dpi in the conveyance direction, while the stage was moved in the conveyance direction (sub-scanning direction) at a velocity of 211 mm/sec. The ejection was performed until 2,000 ink droplets were ejected from each nozzle, so that 96 lines each extending in the conveyance direction were formed. It was confirmed that all of the nozzles employed for the printing ejected ink droplets well during the above ejection process.

After the ink ejection, the printer head was left to stand as they were for predetermined periods (which range from 5 minutes to 45 minutes at an increment of 5 minute), and a new sheet of the recording medium was attached to the stage and ejection was performed under the same conditions as above, thereby obtaining a print sample (96 lines; each nozzle ejected 2,000 ink droplets). A longest period for the standing (a longest permissible standing time) that resulted in complete formation of the 96 lines, which indicates successful ejection from all of the nozzles employed for the printing, was used for the evaluation of ejectability maintenance property. If the longest permissible standing time is longer, more favorable ejectability maintenance property is indicated. The evaluation criteria are as follows:

~Evaluation Criteria~

A: the longest permissible standing time is 45 minutes or more

B: the longest permissible standing time is from 30 minutes to less than 45 minutes C: the longest permissible standing time is from 20 minutes to less than 30 minutes D: the longest permissible standing time is less than 20 minutes

TABLE 1

| Ink | Resin Dispersant | Self-dispersing Polymer Type | Composition Ratio by mass % | Tg (°C.) | I/O | Acid Value | Polymer Particle size | Neutralization Degree |
|---|---|---|---|---|---|---|---|---|
| C-01 | P-1 | B-01 | MMA/IBOMA/MAA 38/52/10 | 160 | 0.523 | 65.1 | 2.8 | 50% |
| C-02 | P-1 | B-01a | MMA/IBOMA/MAA 38/52/10 | 160 | 0.523 | 65.1 | 0.8 | 50% |
| C-03 | P-1 | B-01b | MMA/IBOMA/MAA 38/52/10 | 160 | 0.523 | 65.1 | 2.4 | 50% |
| C-04 | P-1 | B-01c | MMA/IBOMA/MAA 38/52/10 | 160 | 0.523 | 65.1 | 4.1 | 50% |
| C-05 | P-1 | B-01d | MMA/IBOMA/MAA 38/52/10 | 160 | 0.523 | 65.1 | 6.3 | 50% |
| C-06 | P-1 | B-01e | MMA/IBOMA/MAA 38/52/10 | 160 | 0.523 | 65.1 | 50 | 35% |
| C-07 | P-1 | B-01f | MMA/IBOMA/MAA 38/52/10 | 160 | 0.523 | 65.1 | 3.0 | 40% |
| C-08 | P-1 | B-01g | MMA/IBOMA/MAA 38/52/10 | 160 | 0.523 | 65.1 | 2.1 | 60% |
| C-09 | P-1 | B-01h | MMA/IBOMA/MAA 38/52/10 | 160 | 0.523 | 65.1 | 1.9 | 70% |
| C-10 | P-1 | B-02 | MMA/IBOMA/MAA 42/52/6 | 161 | 0.469 | 39.0 | 11 | 83% |
| C-11 | P-1 | B-03 | MMA/IBOMA/MAA 40/52/8 | 160 | 0.502 | 52.1 | 1.9 | 63% |
| C-12 | P-1 | B-04 | MMA/IBOMA/MAA 36.5/52/11.5 | 160 | 0.538 | 74.8 | 2.1 | 43% |
| C-13 | P-1 | B-05 | MMA/IBOMA/MAA 36/52/12 | 160 | 0.543 | 78.1 | 4.2 | 42% |
| C-14 | P-1 | B-06 | MMA/DCPMA/MAA 18/72/8 | 180 | 0.47 | 52.1 | 2.9 | 50% |
| C-15 | P-1 | B-07 | MMA/IBOMA/MAA 70/20/10 | 145 | 0.638 | 65.1 | 2.8 | 50% |
| M-01 | P-2 | B-01 | MMA/IBOMA/MAA 38/52/10 | 160 | 0.523 | 65.1 | 2.8 | 50% |
| Y-01 | P-1 | B-01 | MMA/IBOMA/MAA 38/52/10 | 160 | 0.523 | 65.1 | 2.8 | 50% |
| K-01 | P-1 | B-01 | MMA/IBOMA/MAA 38/52/10 | 160 | 0.523 | 65.1 | 2.8 | 50% |

| Ink | Amount of Water-soluble Carboxylic Acid (mass %) | BL1 80° C. 30% RH | BL2 70° C. 20% RH | Ejection Response | Ejectability Maintenance Property | Viscosity (mPa·s) | Note |
|---|---|---|---|---|---|---|---|
| C-01 | 0.3 | A | A | A | A | 5.3 | Inv |
| C-02 | 0 | A | A | A | B | 6.2 | Inv |
| C-03 | 0.1 | A | A | A | A | 5.4 | Inv |
| C-04 | 0.5 | A | A | A | A | 5 | Inv |
| C-05 | 1 | A | A | B | A | 4.9 | Inv |
| C-06 | 0.3 | A | A | C | A | 4.5 | Comp |
| C-07 | 0.3 | A | A | A | A | 5.3 | Inv |
| C-08 | 0.3 | A | A | A | A | 5.5 | Inv |
| C-09 | 0.3 | A | A | A | B | 5.6 | Inv |
| C-10 | 0.3 | A | A | C | A | 4.6 | Comp |
| C-11 | 0.3 | A | A | A | A | 5.6 | Inv |
| C-12 | 0.3 | A | B | A | A | 5.5 | Inv |

TABLE 1-continued

| | | | | | | | |
|---|---|---|---|---|---|---|---|
| C-13 | 0.3 | A | B | A | A | 4.8 | Inv |
| C-14 | 0.3 | A | A | A | A | 5.3 | Inv |
| C-15 | 0.3 | C | C | A | A | 5.3 | Comp |
| M-01 | 0.3 | A | A | A | A | 5.3 | Inv |
| Y-01 | 0.3 | A | A | A | A | 5.3 | Inv |
| K-01 | 0.3 | A | A | A | A | 5.3 | Inv |

BL1 represents Blocking 1
BL2 represents Blocking 2
The unit for acid value is mgKOH/g
Polymer Particle size is represented by the volume average particle diameter (nm) thereof
In the column for "Note", "Inv" represents "present invention", and "Comp" represents "comparative example"
In the column for composition ratio by mass % of self-dispersing polymer, "MMA" represents methyl methacrylate (I/O value: 0.6), "IBOMA" represents isobornyl methacrylate (I/O value: 0.29), "DCPMA" represents dicyclopentanyl methacrylate (I/O value: 0.32), and "MAA" represents methacrylic acid (I/O value: 1.88).

From the results shown in Table 1, it is understood that the inkjet ink composition of the invention has excellent ejectability maintenance property and excellent ejection response, and that an image formed using the ink composition has excellent blocking resistance even at high temperatures.

Example 2

~Preparation of Treatment Liquid T-2~

The following ingredients were mixed to form a treatment liquid T-2

| | |
|---|---|
| Malonic acid (manufactured by TATEYAMA KASEI Co., Ltd.): | 11.3% |
| DL-malic acid (manufactured by FUSO CHEMICAL CO., LTD.): | 14.5% |
| Diethyleneglycol monobutyl ether (BDG (tradename) manufactured by Nippon Nyukazai Co, Ltd.): | 4% |
| Tripropyleneglycol monomethyl ether (MFTG (tradename) manufactured by Nippon Nyukazai Co., Ltd.): | 4% |
| Ion-exchange water: | 66.2% |

With regard to the properties of the treatment liquid, the treatment liquid had a viscosity of 2.3 mPa·s, a surface tension of 42.5 mN/m, and a pH of 1.0.

An evaluation sample was prepared in the same manner as in Example 1, except that the treatment liquid T-1 was replaced by the treatment liquid T-2, and the evaluation sample obtained was evaluated with respect to the blocking 1 and the blocking 2. As a consequence, evaluation results similar to those of Example 1 were obtained.

Example 3

~Preparation of Treatment Liquid T-3~

The following ingredients were mixed to form a treatment liquid T-3

| | |
|---|---|
| Polyallylamine PAA-HCL-3L (manufactured by Nitto Boseki Co., Ltd.): | 20% |
| Diethyleneglycol (manufactured by Mitsui Chemicals Inc.): | 15% |
| Ion-exchange water: | 65% |

An evaluation sample was prepared in the same manner as in Example 1, except that the treatment liquid T-1 was replaced by the treatment liquid T-3, and the evaluation sample obtained was evaluated with respect to the blocking 1 and the blocking 2. As a consequence, evaluation results similar to those of Example 1 were obtained.

Example 4

~Preparation of Treatment Liquid T-4~

The following ingredients were mixed to form a treatment liquid T-4

| | |
|---|---|
| Magnesium sulfate heptahydrate (manufactured by Wako Pure Chemical Industries Ltd.): | 27% |
| Glycerin (manufactured by NOF Corporation): | 5% |
| Ethanol (manufactured by Wako Pure Chemical Industries Ltd.): | 3% |
| Ion-exchange water: | 67% |

An evaluation sample was prepared in the same manner as in Example 1, except that the treatment liquid T-1 was replaced by the treatment liquid T-4, and the evaluation sample obtained was evaluated with respect to the blocking 1 and the blocking 2. As a consequence, evaluation results similar to those of Example 1 were obtained.

Example 5

~Preparation of Ink~

Magenta inks M-21 to M-25 and M-31 to M-35, cyan inks C-21 to C-23, yellow inks Y-21 to Y-23, and black inks K-21 to K-25 were prepared so as to have the compositions shown in Tables 2 and 3.

<Image Forming Method and Evaluation>

Ink droplets were ejected using the inkjet recording apparatus described below and the inks shown in Tables 2 and 3, in the manner described below, thereby forming an image.

The ejection was performed at a resolution of 1,200 dpi× 1,200 dpi and an ejected liquid volume per droplet of 3 pL, using the treatment liquid T-1 as a treatment liquid and double-sided TOKUBISHI ART N (basis weight: 104.7 g/m²) as a recording medium.

A recording medium 22 was fed from a paper feed section 10 of an inkjet recording apparatus 1 illustrated in FIG. 1 towards a printing drum 70, and an entire one surface of the recording medium 22 on a treatment liquid drum 54 (diameter: 450 mm) was coated with a thin layer (2 μm in thickness) of the treatment liquid T-1 by a treatment liquid coating apparatus 56. Here, a gravure coater was used as the treatment liquid coating apparatus 56.

Subsequently, the recording medium 22 coated with the treatment liquid T-1 was subjected to a drying treatment by a warm air blowing nozzle 58 (blowing a warm air having a temperature of 70° C. at a rate of 9 m³/minute) and an IR heater 60 (180° C.), thereby drying off a part of the solvent contained in the treatment liquid.

The recording medium 22 was conveyed, via a first intermediate conveyance portion 24, to a printing section 14, at which aqueous inks of CMYK (cyan, magenta, yellow, and black) were ejected from heads 72K, 72Y, 72M, and 72C according to image signals for solid images of respective colors, and spotted on the recording medium 22. The volume (per dot) of the ink ejected was 1.4 pL at highlight areas, and 3 pL (2 drops) at high concentration areas. The recording density for the recording was 1,200 dpi at each of the main scanning direction and the sub-scanning direction. Here, when a nozzle became unable to eject ink droplets, a treatment whereby the amount of the ink ejected from a nozzle adjacent to the ejection-failure nozzle was increased to 5 pL (3 drops) was performed so as to make less distinct a streak-like density unevenness due to the ejection failure. Since the treatment liquid drum 54 and a drying drum 76 were provided as separate members from the printing drum 70, heat and blown air therefrom were prevented from adversely affecting the printing section even when the drying of the treatment liquid was performed at high speed, so that stable ejection could be achieved.

Then, the recording medium 22 was dried on the drying drum 76, by a first IR heater 78 (surface temperature: 180° C.), a warm air blowing nozzle 80 (blowing 70° C. warm air at an air volume of 12 m³/minute), and a second IR heater 82 (surface temperature: 180° C.). The drying time was 2 seconds.

Then, the image formed on the recording medium 22 was thermally fixed by a fixing drum 84 at 50° C., a first fixing roller 86 at 80° C. and a second fixing roller 88 at 80° C., at a nip pressure of 0.30 MPa. Here, a roller that was obtained by coating a metal core with a 6 mm-thick silicone rubber having a hardness of 30 degrees and further applying a 50 μm-thick soft PFA coat onto the silicone rubber, and that had excellent tight-contact properties with an ink image and excellent detachability from an ink image was used as each of the first fixing roller 86 and the second fixing roller 88.

The recording medium 22 was conveyed at a conveyance velocity of 535 mm/s by a drum conveyance by the respective drums 54, 70, 76, and 84, and intermediate conveyance members 30.

An evaluation sample of the image-formed recording medium was obtained through the above processes.

(Evaluation of Blocking)

A test piece having a size of 3.5 cm×4 cm was cut out from a monocolor high-density area (at an amount of spotted ink of 3 pL for each of 1,200 dpi×1,200 dpi dots) of the evaluation sample obtained above, and was evaluated for blocking 1 and 2 in the same manner as in Example 1.

TABLE 2

| | | Ink Name | | | | | | | | | |
|---|---|---|---|---|---|---|---|---|---|---|---|
| | | M-21 | M-22 | M-23 | M-24 | M-25 | M-31 | M-32 | M-33 | M-34 | M-35 |
| Ink Composition | Pigment | PR122 5% | PR122 5% | PR122 5% | PR122 5% | PR122 5% | PR122 5% | PR122 5% | PR122 5% | PR122 5% | PR122 5% |
| | Resin Dispersant | P-2 1.5% | P-2 1.5% | P-2 1.5% | P-2 1.5% | P-2 1.5% | P-2 1.5% | P-2 1.5% | P-2 1.5% | P-2 1.5% | P-2 1.5% |
| | Self-dispersing Polymer | B-01 7.25% | B-01 7.25% | B-03 7% | B-03 7% | B-03 7% | B-07 7.25% | B-07 7.25% | B-07 7.25% | B-07 7.25% | B-07 7.25% |
| | Solvent 1 | GP-250 6% | GP-250 8% | GP-250 6% | GP-250 8% | GP-250 10% | GP-250 6% | GP-250 8% | GP-250 6% | GP-250 8% | GP-250 10% |
| | Solvent 2 | TPGmME 10% | TPGmME 8% | TPGmME 10% | TPGmME 8% | TPGmME 6% | TPGmME 10% | TPGmME 8% | TPGmME 10% | TPGmME 8% | TPGmME 6% |
| | Thickener | Not Added | Not Added | PE-108 0.1% | PE-108 0.1% | PE-108 0.1% | Not Added | Not Added | PE-108 0.1% | PE-108 0.1% | PE-108 0.1% |
| | Urea | 5% | 5% | 5% | 5% | 5% | 5% | 5% | 5% | 5% | 5% |
| | OLFINE E1010 (tradename) | 1% | 1% | 1% | 1% | 1% | 1% | 1% | 1% | 1% | 1% |
| Ink Properties | Blocking 1 at 60° C. 30% RH | A | A | A | A | A | B | C | B | C | C |
| | Blocking 2 at 70° C. 20% RH | A | A | A | A | A | C | C | C | C | C |
| | Ejection Response | A | A | A | A | A | A | A | A | A | A |
| | Ejectability Maintenance Properties | A | A | A | A | A | A | A | A | A | A |
| | Viscosity (mPa·s) | 5.3 | 5.4 | 5.6 | 5.6 | 5.7 | 5.3 | 5.3 | 5.3 | 5.3 | 5.3 |
| | Note | Inv | Inv | Inv | Inv | Inv | Comp | Comp | Comp | Comp | Comp |

* Percent values in the tables indicate percent by mass, "Inv" represents "invention", "Comp" represents "comparative example", GP-250 represents SANNIX (NEWPOL) GP-250 (tradename), and TPGmME represents tripropyleneglycol monomethyl ether.

TABLE 3

| | | Ink Name | | | | | |
|---|---|---|---|---|---|---|---|
| | | C-21 | C-22 | C-23 | Y-21 | Y-22 | Y-23 |
| Ink Composition | Pigment | PB15:3 2.5% | PB15:3 2.5% | PB15:3 2.5% | PY74 4% | PY74 4% | PY74 4% |
| | Resin Dispersant | P-1 1.125% | P-1 1.125% | P-1 1.125% | P-1 1.7% | P-1 1.7% | P-1 1.7% |

TABLE 3-continued

|  |  | | | | | | |
|---|---|---|---|---|---|---|---|
|  | Self-dispersing Polymer | B-03<br>8.5% | B-03<br>8.5% | B-03<br>8.5% | B-03<br>7% | B-03<br>7% | B-03<br>7% |
|  | Solvent 1 | GP-250<br>6% | GP-250<br>8% | GP-250<br>10% | GP-250<br>6% | GP-250<br>8% | GP-250<br>10% |
|  | Solvent 2 | TPGmME<br>10% | TPGmME<br>8% | TPGmME<br>6% | TPGmME<br>10% | TPGmME<br>8% | TPGmME<br>6% |
|  | Thickener | PE-108<br>0.15% | PE-108<br>0.15% | PE-108<br>0.15% | PE-108<br>0.15% | PE-108<br>0.15% | PE-108<br>0.15% |
|  | Urea | 5% | 5% | 5% | 5% | 5% | 5% |
|  | OLFINE E1010 (tradename) | 1% | 1% | 1% | 1% | 1% | 1% |
| Ink Properties | Blocking 1 at 60° C. 30% RH | A | A | A | A | A | A |
|  | Blocking 2 at 70° C. 20% RH | A | A | A | A | A | A |
|  | Ejection Response | A | A | A | A | A | A |
|  | Ejectability Maintenance Properties | A | A | A | A | A | A |
|  | Viscosity (mPa · s) | 5.6 | 5.6 | 5.7 | 5.6 | 5.6 | 5.6 |
|  | Note | Inv | Inv | Inv | Inv | Inv | Inv |

|  |  |  | Ink Name | | | | |
|---|---|---|---|---|---|---|---|
|  |  |  | K-21 | K-22 | K-23 | K-24 | K-25 |
| Ink Composition | | Pigment | Carbon Black 4% | Carbon Black 4% | Carbon Black 4% | Carbon Black 4% | Carbon Black 4% |
|  | | Resin Dispersant | P-1<br>2.3% | P-1<br>2.3% | P-1<br>2.3% | P-1<br>2.3% | P-1<br>2.3% |
|  | | Self-dispersing Polymer | B-03<br>5.2% | B-03<br>5.2% | B-03<br>5.2% | B-03<br>5.2% | B-03<br>5.2% |
|  | | Solvent 1 | GP-250<br>6% | GP-250<br>8% | GP-250<br>10% | GP-250<br>6% | GP-250<br>6% |
|  | | Solvent 2 | TPGmME<br>10% | TPGmME<br>8% | TPGmME<br>6% | TPGmME<br>10% | TPGmME<br>10% |
|  | | Thickener | PE-108<br>0.3% | PE-108<br>0.3% | PE-108<br>0.3% | PE-108<br>0.15% | Not Added |
|  | | Urea | 5% | 5% | 5% | 5% | 5% |
|  | | OLFINE E1010 (tradename) | 1% | 1% | 1% | 1.5% | 1.2% |
| Ink Properties | | Blocking 1 at 60° C. 30% RH | A | A | A | A | A |
|  | | Blocking 2 at 70° C. 20% RH | A | A | A | A | A |
|  | | Ejection Response | A | A | A | A | A |
|  | | Ejectability Maintenance Properties | A | A | A | A | A |
|  | | Viscosity (mPa · s) | 5.6 | 5.6 | 5.6 | 5.7 | 5.8 |
|  | | Note | Inv | Inv | Inv | Inv | Inv |

\* Percent values in the tables indicate percent by mass, "Inv" represents "invention", "Comp" represents "comparative example", GP-250 represents SANNIX (NEWPOL) GP-250 (tradename), and TPGmME represents tripropyleneglycol monomethyl ether.

From the results shown in Table 2 and 3, it is understood that the inkjet ink composition of the invention has excellent ejectability maintenance property and excellent ejection response, and that an image formed using the ink composition has excellent blocking resistance even at high temperatures.

Example 6

When images were formed using the inks employed in Example 1 and the treatment liquids employed in Examples 2, 3, and 4 and were evaluated for blocking 1 and 2, favorable results were obtained, similar to the results of Example 1.

Example 7

When images were formed using the inks of the invention in the same manner as in Example 6, except that OK TOP-KOTE PLUS (tradename, manufactured by Oji Paper Co., Ltd.) having a basis weight of from 104 to 154 g/m², N SILVER DAIYA (tradename, manufactured by Nippon Paper Industries Co., Ltd.) having a basis weight of from 104 to 154 g/m², and NEW V MATT (tradename, manufactured by Mitsubishi Paper Mills Ltd.) having a basis weight of from 104 to 154 g/m² were used as recording media instead of the TOKUBISHI ART having a basis weight of 104.7 g/m². The images obtained were evaluated for blocking 1 and 2, and favorable results were obtained, similarly to the case of the TOKUBISHI ART paper having a basis weight of 104.7 g/m².

All publications, patent applications, and technical standards mentioned in this specification are herein incorporated by reference to the same extent as if each individual publication, patent application, or technical standard was specifically and individually indicated to be incorporated by reference.

Embodiments of the invention include, but are not limited to, the following.

<1> An inkjet ink composition comprising a colorant, two or more hydrophilic organic solvents, and particles of a polymer containing a structural unit derived from a hydrophilic monomer and a structural unit derived from a hydrophobic monomer and having a glass transition temperature of 150° C. or higher and an I/O value of from 0.2 to 0.55, the particles having a volume average particle diameter of from 0.1 to 10 nm.

<2> The inkjet ink composition according to <1>, further comprising at least one of a water-soluble acidic compound having a molecular weight of 200 or less or a salt thereof, wherein a total content of water-soluble acidic compounds having a molecular weight of 200 or less and salts thereof in the inkjet ink composition is from 0.1% by mass to 0.5% by mass relative to the polymer particles. The water-soluble acidic compound may be an acidic compound having a carboxyl group.

<3> The inkjet ink composition according to <1> or <2>, further comprising at least one of an acidic compound having a carboxyl group, a salt of an acidic compound having a carboxyl group, or an inorganic salt.

<4> The inkjet ink composition according to any one of <1> to <3>, wherein the polymer has an acid value of from 50 to 75 mgKOH/g, and a neutralization degree of from 40% to 60%.

<5> The inkjet ink composition according to any one of <1> to <4>, further comprising a solid moistening agent.

<6> The inkjet ink composition according to <5>, wherein the solid moistening agent is at least one compound selected from urea and urea derivatives.

<7> The inkjet ink composition according to any one of <1> to <6>, wherein the two or more hydrophilic organic solvents include a first hydrophilic organic solvent and a second hydrophilic organic solvent, and a content ratio of the second hydrophilic organic solvent to the first hydrophilic organic solvent is from 1:10 to 10:1.

<8> The inkjet ink composition according to any one of <1> to <7>, further comprising a thickening agent.

<9> The inkjet ink composition according to any one of <1> to <8>, further comprising a nonionic surfactant.

<10> An ink set comprising the inkjet ink composition of any one of <1> to <9> and a treatment liquid capable of aggregating components of the inkjet ink composition.

<11> An image forming method comprising:
applying the inkjet ink composition of any one of <1> to <9> to a recording medium; and
applying, to the recording medium, a treatment liquid capable of causing formation of an aggregate when contacting with components of the inkjet ink composition.

<12> The image forming method according to <11>, further comprising heating the recording medium to which the inkjet ink composition has been applied, thereby fixing the applied inkjet ink composition to the recording medium.

<13> A recorded material obtainable by recording on a recording medium by the image forming method of <11> or <12>.

What is claimed is:

1. An inkjet ink composition comprising a colorant, two or more hydrophilic organic solvents, and particles of a polymer containing a structural unit derived from a hydrophilic monomer and a structural unit derived from a hydrophobic monomer and having a glass transition temperature of 150° C. or higher and an I/O value of from 0.2 to 0.55, the particles having a volume average particle diameter of from 0.1 to 10 nm.

2. The inkjet ink composition according to claim 1, further comprising at least one of a water-soluble acidic compound having a molecular weight of 200 or less or a salt thereof, wherein a total content of water-soluble acidic compounds having a molecular weight of 200 or less and salts thereof in the inkjet ink composition is from 0.1% by mass to 0.5% by mass relative to the polymer particles.

3. The inkjet ink composition according to claim 1, further comprising at least one of an acidic compound having a carboxyl group, a salt of an acidic compound having a carboxyl group, or an inorganic salt.

4. The inkjet ink composition according to claim 1, wherein the polymer has an acid value of from 50 to 75 mgKOH/g, and a neutralization degree of from 40% to 60%.

5. The inkjet ink composition according to claim 1, further comprising a solid moistening agent.

6. The inkjet ink composition according to claim 5, wherein the solid moistening agent is at least one compound selected from urea and urea derivatives.

7. The inkjet ink composition according to claim 1, wherein the two or more hydrophilic organic solvents include a first hydrophilic organic solvent and a second hydrophilic organic solvent, and a content ratio of the second hydrophilic organic solvent to the first hydrophilic organic solvent is from 1:10 to 10:1.

8. The inkjet ink composition according to claim 1, further comprising a thickening agent.

9. The inkjet ink composition according to claim 1, further comprising a nonionic surfactant.

10. An ink set comprising the inkjet ink composition of claim 1 and a treatment liquid capable of aggregating components of the inkjet ink composition.

11. An image forming method comprising:
applying the inkjet ink composition of claim 1 to a recording medium; and
applying, to the recording medium, a treatment liquid capable of causing formation of an aggregate when contacting with components of the inkjet ink composition.

12. The image forming method according to claim 11, further comprising heating the recording medium to which the inkjet ink composition has been applied, thereby fixing the applied inkjet ink composition to the recording medium.

13. A recorded material obtainable by recording on a recording medium by the image forming method of claim 11.

* * * * *